(12) United States Patent
Itagaki

(10) Patent No.: US 11,859,396 B2
(45) Date of Patent: Jan. 2, 2024

(54) BINDING MACHINE

(71) Applicant: MAX CO., LTD., Tokyo (JP)

(72) Inventor: Osamu Itagaki, Tokyo (JP)

(73) Assignee: Max Co., Ltd., Tokyo (JP)

( * ) Notice: Subject to any disclaimer, the term of this patent is extended or adjusted under 35 U.S.C. 154(b) by 476 days.

(21) Appl. No.: 17/105,955

(22) Filed: Nov. 27, 2020

(65) Prior Publication Data

US 2021/0148127 A1     May 20, 2021

Related U.S. Application Data

(63) Continuation of application No. 15/847,660, filed on Dec. 19, 2017, now Pat. No. 10,883,284.

(30) Foreign Application Priority Data

Dec. 29, 2016    (JP) ................................. 2016-257453

(51) Int. Cl.
     *E04G 21/12*      (2006.01)
     *B65B 13/34*      (2006.01)
     (Continued)

(52) U.S. Cl.
     CPC .......... *E04G 21/123* (2013.01); *B65B 13/025* (2013.01); *B65B 13/345* (2013.01); *H02G 1/005* (2013.01); *H02G 1/1292* (2013.01)

(58) Field of Classification Search
     CPC ........ B21F 9/02; B21F 33/005; E04G 21/122; E04G 21/123; B26D 1/48; B26D 7/08; B26D 7/14; B65B 13/00; B65B 13/18; B65B 13/22; B65B 13/027; B65B 13/025; B65B 13/345; B25B 25/00; H02G 1/005; H02G 1/1292; H02G 1/1229; H02G 1/1246; H02G 1/1224
(Continued)

(56) References Cited

U.S. PATENT DOCUMENTS 6,324,712 B1 * 12/2001 Elsener, Sr. ............. B25F 1/003
                                                          7/129
6,513,555 B1      2/2003 Lesser et al.
(Continued)

FOREIGN PATENT DOCUMENTS

| CN | 2423202 Y | 3/2001 |
|----|-----------|--------|
| CN | 1331645 A | 1/2002 |

(Continued)

OTHER PUBLICATIONS

Machine Translation of JP-2004142814-A (Year: 2004).*
(Continued)

*Primary Examiner* — Bobby Yeonjin Kim
(74) *Attorney, Agent, or Firm* — Banner & Witcoff, Ltd.

(57) ABSTRACT

A binding machine includes a wire feeding unit configured to feed a wire to be wound on an object to be bound, a cutting unit configured to cut the wire wound on the object to be bound, and a binding unit configured to twist the wire wound on the object to be bound. The cutting unit includes a pair of blade parts configured to interpose the wire therebetween and cut the wire. One or both of the pair of blade parts include a delay part which is configured to delay cutting a part of the wire as compared to a remaining part of the wire.

8 Claims, 21 Drawing Sheets

(51) Int. Cl.
*H02G 1/00* (2006.01)
*H02G 1/12* (2006.01)
*B65B 13/02* (2006.01)

(58) Field of Classification Search
USPC .............................................. 140/139, 123.6
See application file for complete search history.

(56) References Cited

U.S. PATENT DOCUMENTS

| | | |
|---|---|---|
| 2004/0244866 A1 | 12/2004 | Ishikawa et al. |
| 2009/0283168 A1 | 11/2009 | Kusakari |
| 2016/0031575 A1 | 2/2016 | Shindou |

FOREIGN PATENT DOCUMENTS

| | | |
|---|---|---|
| CN | 1531497 A | 9/2004 |
| CN | 2652552 Y | 11/2004 |
| CN | 201086837 Y | 7/2008 |
| CN | 101585422 A | 11/2009 |
| CN | 105314142 A | 2/2016 |
| GB | 1260071 A | 1/1972 |
| JP | UM-S55-175020 A | 12/1980 |
| JP | H08-057167 A | 3/1996 |
| JP | 2000-158381 A | 6/2000 |
| JP | 2004-142814 A | 5/2004 |
| JP | 4016802 B2 | 12/2007 |
| WO | 98/10161 A1 | 3/1998 |
| WO | 2005/037490 A1 | 4/2005 |

OTHER PUBLICATIONS

Extended European Search Report dated Feb. 7, 2018 in corresponding EP Patent Application No. 17208795.9 (7 pages).
Office Action issued for corresponding Japanese Patent Application No. 2016-257453 dated Sep. 15, 2020, (8 pages).
Machine Translation of JP-2004142814-A from ESPACENET, Publication Year 2004, Total pp. 9 (Year: 2019).
Translation of Japanese Office Action dated Sep. 15, 2020 (Year: 2020).

\* cited by examiner

BINDING MACHINE

CROSS-REFERENCE TO RELATED APPLICATION

This application is a continuation of U.S. patent application Ser. No. 15/847,660, filed on Dec. 19, 2017, which claims priority from Japanese Patent Application No. 2016-257453 filed on Dec. 29, 2016, the entire contents of which are incorporated herein by reference.

FIELD

The present disclosure relates to a binding machine configured to bind an object to be bound such as a reinforcing bar with a wire.

BACKGROUND

In the related art, a binding machine called as a reinforcing bar binding machine configured to wind a wire on two or more reinforcing bars, and to bind the two or more reinforcing bars with the wire by twisting the wire wound on the reinforcing bars has been suggested.

The binding machine is configured to wind the long wire on the reinforcing bars, to cut the wire wound on the reinforcing bars and to twist the wire. To this end, a binding machine has been suggested in which a mechanism configured to cut a wire is provided and the wire is interposed between a pair of blade parts configured to sliding contact and is cut by shearing (for example, refer to Japanese Patent No. 4,016,802B).

In the binding machine of the related art configured to cut the wire by the shearing resulting from the relative movement of the pair of blade parts, a high-torque motor is used, a drive current is increased, and the like, in correspondence to a load upon cutting of the wire, for example.

However, such measures cause enlargement of the machine and increase in power consumption.

The present disclosure has been made in view of the above situations, and an object thereof is to provide a binding machine capable of reducing a load upon cutting of a wire.

In order to accomplish the above object, the present disclosure provides a binding machine including a wire feeding unit configured to feed a wire to be wound on an object to be bound, a cutting unit configured to cut the wire wound on the object to be bound, and a binding unit configured to twist the wire wound on the object to be bound, wherein the cutting unit includes a pair of blade parts configured to interpose the wire therebetween and cut the wire, and wherein one or both of the pair of blade parts comprises a delay part configured to delay cutting a part of the wire as compared to a remaining part of the wire.

Also, the present disclosure provides a binding machine including a wire feeding unit configured to feed a wire to be wound on an object to be bound, a cutting unit configured to cut the wire wound on the object to be bound, and a binding unit configured to twist the wire wound on the object to be bound, wherein the cutting unit includes a pair of blade parts configured to interpose the wire therebetween and cut the wire, and wherein one or both of the pair of blade parts are formed to have a crank shape in a cutting direction of the blade parts.

Also, the present disclosure provides a binding machine including a wire feeding unit configured to feed a wire to be wound on an object to be bound, a cutting unit configured to cut the wire wound on the object to be bound, and a binding unit configured to twist the wire wound on the object to be bound, wherein the cutting unit includes a pair of blade parts configured to interpose the wire therebetween and cut the wire, and wherein at least a part of one or both of the pair of blade parts is inclined in to a cutting direction of the blade parts.

According to the present disclosure, since it is possible to vary timing at which the cutting of the wire starts, it is possible to reduce the load, as compared to the related art. In this way, the load upon the cutting of the wire is reduced, so that it is possible not only to use a low-torque motor and to lower a drive current, as compared to the related art, but also to miniaturize the machine and to save the power consumption.

DETAILED DESCRIPTION

Hereinafter, an example of a reinforcing bar binding machine, which is an embodiment of the binding machine of the present disclosure, will be described with reference to the drawings.

Example of Configuration of Reinforcing Bar Binding Machine of Embodiment

Figure 1:
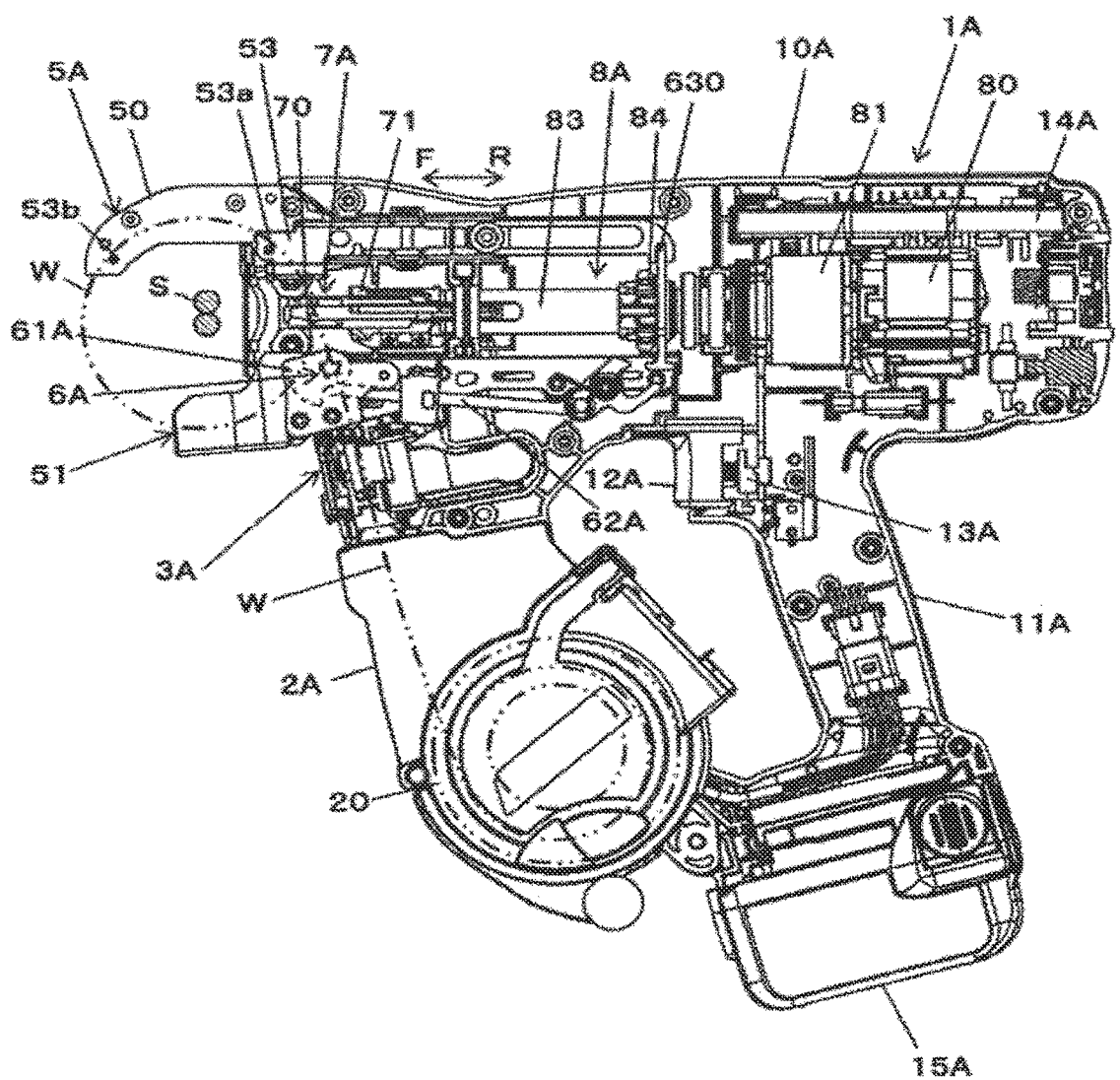
FIG. 1 is a view depicting an example of an entire configuration of a reinforcing bar binding machine of an embodiment, as seen from a side.
Figure 2:
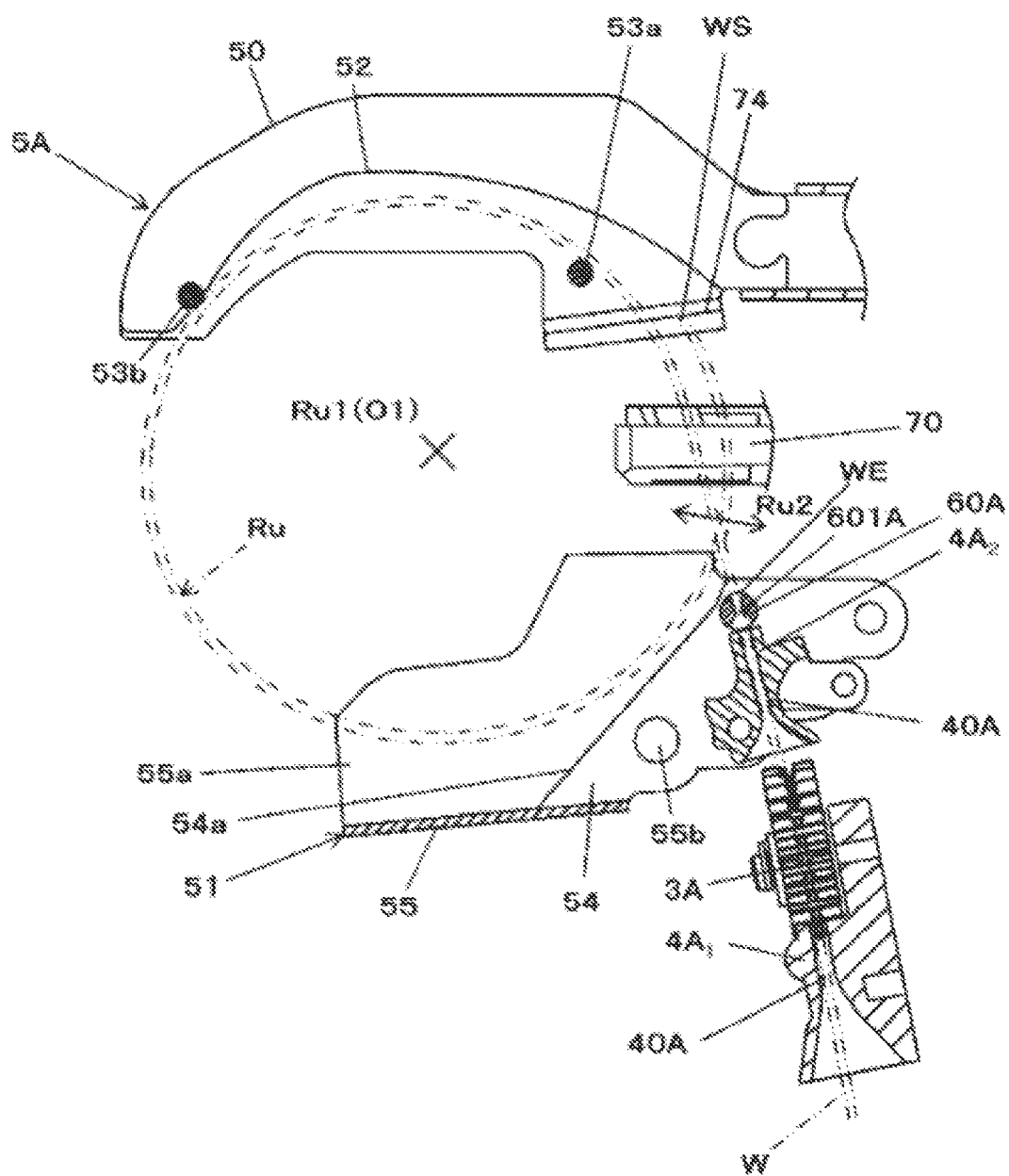
FIG. 2 is a view depicting an example of a main configuration of the reinforcing bar binding machine of the embodiment, as seen from a side.

FIG. 1 is a view depicting an example of an entire configuration of a reinforcing bar binding machine of an embodiment, as seen from a side, and FIG. 2 is a view depicting an example of a main configuration of the reinforcing bar binding machine of the embodiment, as seen from a side.

A reinforcing bar binding machine 1A of an embodiment is configured to feed wire W in a forward direction, which is one direction, to wind the wires around reinforcing bars S, which are an object to be bound, to feed the wire wound around the reinforcing bars S in a reverse direction, which is the other direction, to wind the wire on the reinforcing bars S, and to twist the wire W, thereby binding the reinforcing bars S with the wire W.

To this end, the reinforcing bar binding machine 1A includes a magazine 2A, which is an accommodation unit configured to accommodate therein the wire W, and a wire feeding unit 3A configured to feed the wire W. Also, the reinforcing bar binding machine 1A includes a first wire guide $4A_1$ configured to guide the wire W, which is to be fed into the wire feeding unit 3A, and a second wire guide $4A_2$ configured to guide the wire W, which is to be delivered from the wire feeding unit 3A.

Also, the reinforcing bar binding machine 1A includes a curl guide unit 5A configured to form a path along which the wire W fed by the wire feeding unit 3A is to be wound around the reinforcing bars S, and a cutting unit 6A configured to cut the wire W wound around the reinforcing bars S. Also, the reinforcing bar binding machine 1A includes a binding unit 7A configured to twist the wire W wound on the reinforcing bars S.

The magazine 2A is an example a reel accommodation unit. A reel 20 on which the long wire W is wound to be reeled out is rotatably and detachably accommodated in the magazine 2A. In the reinforcing bar binding machine 1A of the embodiment, the two wires W are wound to be reeled out on the reel 20 so that the reinforcing bars S can be bound with the two wires W.

A wire made of a plastically deformable metal wire, a wire having a metal wire covered with a resin, a twisted wire or the like can be used as the wire W.

Figure 3:
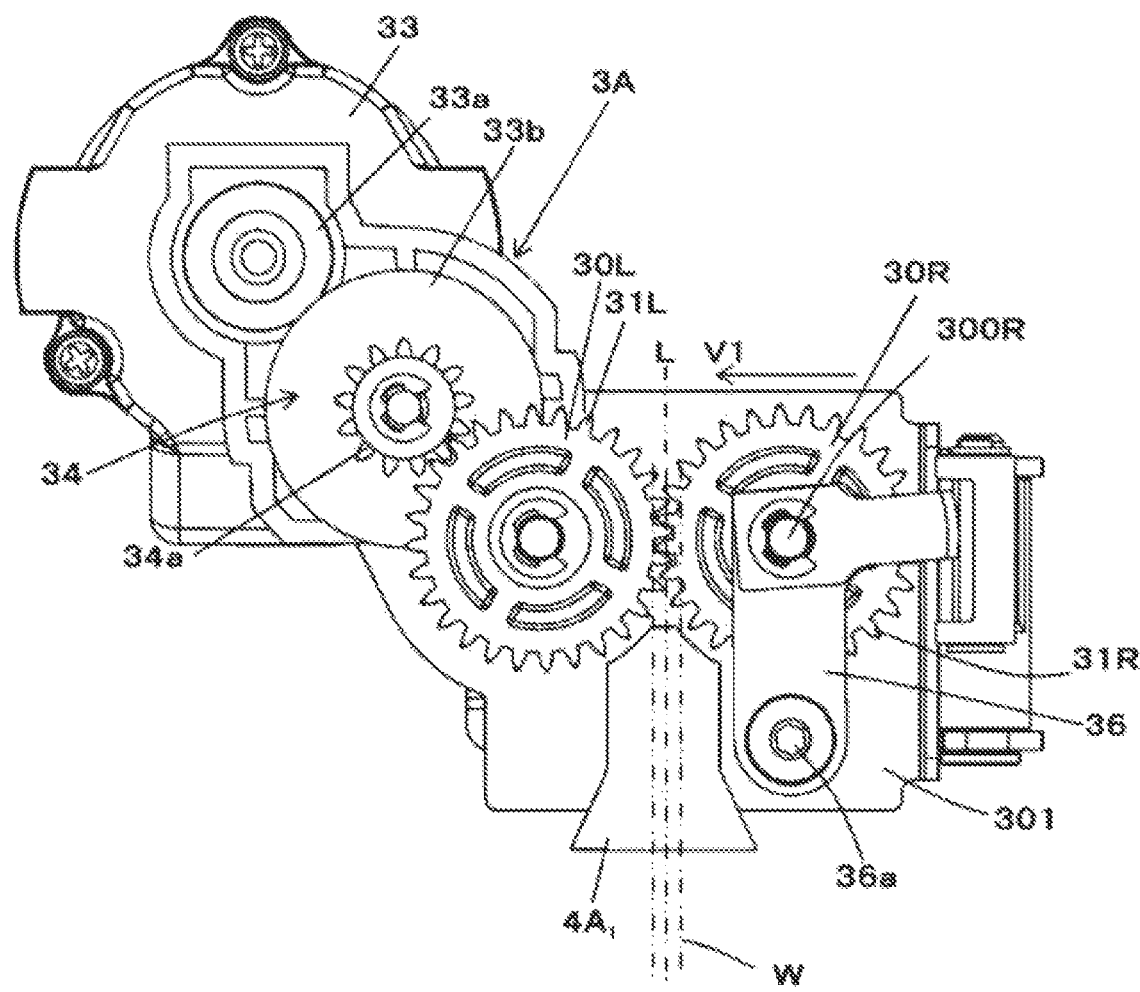
FIG. 3 is a view depicting an example of a wire feeding unit.
Figure 4:
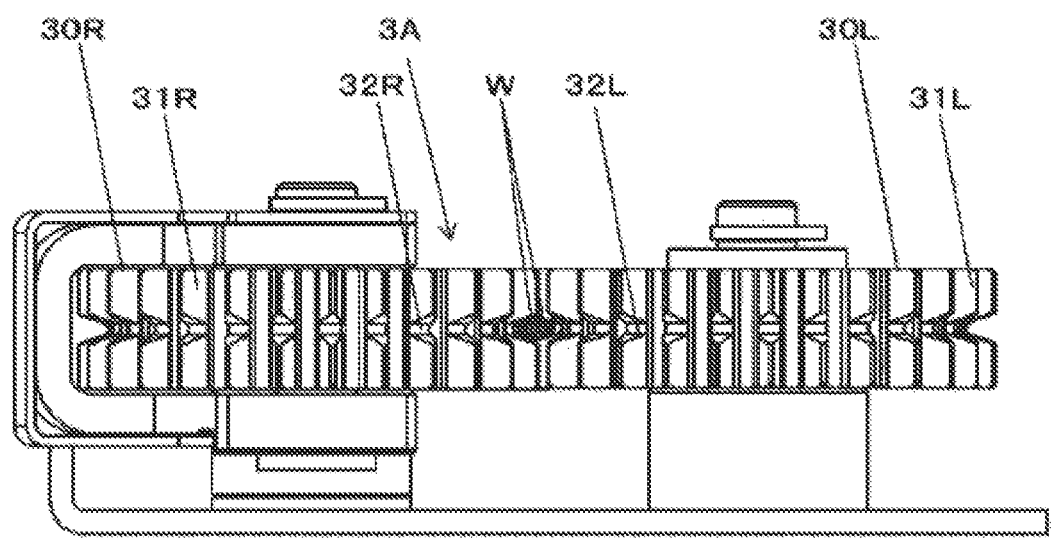
FIG. 4 is a view depicting the example of the wire feeding unit.

FIGS. 3 and 4 depict an example of the wire feeding unit. Subsequently, a configuration of the wire feeding unit 3A is described. The wire feeding unit 3A includes, a first feeding gear 30L and a second feeding gear 30R configured to feed the wire W by a rotating operation.

The first feeding gear 30L and the second feeding gear 30R are a pair of feeding members configured to sandwich and feed two wires W aligned in parallel.

The first feeding gear 30L has a tooth part 31L configured to transmit a drive force. In this example, the tooth part 31L has a spur gear shape, and is formed on an entire circumference of an outer periphery of the first feeding gear 30L. Also, the first feeding gear 30L has a groove portion 32L into which the wire W enters. In this example, the groove portion 32L is a concave portion of which a sectional shape is a substantial V shape, and is formed on the entire circumference of the outer periphery of the first feeding gear 30L along a circumferential direction.

The second feeding gear 30R has a tooth part 31R configured to transmit a drive force. In this example, the tooth part 31R has a spur gear shape, and is formed on an entire circumference of an outer periphery of the second feeding gear 30R. Also, the second feeding gear 30R has a groove portion 32R into which the wire W enters. In this example, the groove portion 32R is a concave portion of which a sectional shape is a substantial V shape, and is formed on the entire circumference of the outer periphery of the second feeding gear 30R along a circumferential direction.

The first feeding gear 30L and the second feeding gear 30R are provided with the feeding path of the wire W being interposed therebetween so that the groove portion 32L and the groove portion 32R are arranged to face each other.

The first feeding gear 30L and the second feeding gear 30R are pressed so that the first feeding gear 30L and the second feeding gear 30R come close to each other so as to sandwich the wire W therebetween. Thereby, the wire feeding unit 3A sandwiches the wire W between the groove portion 32L of the first feeding gear 30L and the groove portion 32R of the second feeding gear 30R.

Therefore, the wire feeding unit 3A includes a displacement member 36 configured to displace the second feeding gear 30R in directions of coming close to and separating from the first feeding gear 30L. The second feeding gear 30R is rotatably supported to one end portion of the displacement member 36 by a shaft 300R. Also, the other end portion of the displacement member 36 is supported to a support member 301 of the wire feeding unit 3A so that the displacement member can rotate about a shaft 36a, which is a support point.

The displacement member 36 is configured to be pressed by a spring (not shown) and to be displaced in an arrow V1 direction by a rotating operation about the shaft 36a, which is a support point. Thereby, the second feeding gear 30R is pressed toward the first feeding gear 30L by a force of a spring 38.

When the wire W is mounted between the first feeding gear 30L and the second feeding gear 30R, the wire W is sandwiched by the groove portion 32L of the first feeding gear 30L and the groove portion 32R of the second feeding gear 30R.

Also, at a state where the wire W is sandwiched between the groove portion 32L of the first feeding gear 30L and the groove portion 32R of the second feeding gear 30R, the tooth part 31L of the first feeding gear 30L and the tooth part 31R of the second feeding gear 30R are meshed with each other. Thereby, the drive force is transmitted between the first feeding gear 30L and the second feeding gear 30R by rotation.

The wire feeding unit 3A includes a feeding motor 33, and a drive force transmission mechanism 34 configured to transmit a drive force of the feeding motor 33 to the first feeding gear 30L.

The feeding motor 33 is an example of the prime mover configured to drive one of the first feeding gear 30L and the second feeding gear 30R. In this example, the feeding motor 33 is configured to drive the first feeding gear 30L.

The drive force transmission mechanism 34 is an example of a motor drive force transmission part. The drive force transmission mechanism 34 includes a small gear 33a mounted to a shaft of the feeding motor 33 and a large gear 33b configured to mesh with the small gear 33a. Also, the drive force transmission mechanism 34 includes a feeding small gear 34a, which the drive force is transmitted thereto from the large gear 33b and is configured to mesh with the first feeding gear 30L. The small gear 33a, the large gear 33b and the feeding small gear 34a are respectively configured by a spur gear.

The first feeding gear 30L is configured to rotate as a rotating operation of the feeding motor 33 is transmitted thereto via the drive force transmission mechanism 34. The second feeding gear 30R is configured to rotate in conjunction with the first feeding gear 30L as a rotating operation of the first feeding gear 30L is transmitted thereto through engagement between the tooth part 31L and the tooth part 31R.

Thereby, the wire feeding unit 3A is configured to feed the wire W sandwiched between the first feeding gear 30L and the second feeding gear 30R along the extension direction of the wire W. In the configuration of feeding the two wires W, the two wires W are fed with being aligned in parallel by a frictional force that is to be generated between the groove portion 32L of the first feeding gear 30L and one wire W, a frictional force that is to be generated between the groove portion 32R of the second feeding gear 30R and the other wire W, and a frictional force that is to be generated between one wire W and the other wire W.

The wire feeding unit 3A is configured so that the rotation directions of the first feeding gear 30L and the second feeding gear 30R are switched and the feeding direction of the wire W is switched between the forward and reverse directions by switching the rotation direction of the feeding motor 33 between the forward and reverse directions.

Subsequently, the wire guide configured to guide the feeding of the wire W is described. As shown in FIG. 2, the first wire guide $4A_1$ is arranged upstream of the first feeding gear 30L and the second feeding gear 30R with respect to the feeding direction of the wire W to be fed in the forward direction. Also, the second wire guide $4A_2$ is arranged downstream of the first feeding gear 30L and the second feeding gear 30R with respect to the feeding direction of the wire W to be fed in the forward direction.

The first wire guide $4A_1$ and the second wire guide $4A_2$ have a guide hole 40A through which the wire W is to pass, respectively. The guide hole 40A has a shape for regulating a radial position of the wire W. In the configuration of feeding the two wires W, the first wire guide $4A_1$ and the second wire guide $4A_2$ are respectively formed with the guide hole 40A having a shape through which the two wires W is to pass with being aligned in parallel.

The guide hole 40A of the first wire guide $4A_1$ and the second wire guide $4A_2$ is provided on a feeding path L of the wire W to pass between the first feeding gear 30L and the second feeding gear 30R. The first wire guide $4A_1$ is configured to guide the wire W to pass through the guide hole 40A to the feeding path L between the first feeding gear 30L and the second feeding gear 30R.

A wire introduction part, which is provided upstream of the guide hole 40A with respect to the feeding direction of the wire W to be fed in the forward direction, has a tapered shape of which an opening area is larger at an upstream side than a downstream side, such as a conical shape, a pyramid shape or the like. Thereby, the wire W can be easily introduced into the first wire guide $4A_1$ and the second wire guide $4A_2$.

Subsequently, the curl guide unit 5A configured to form the feeding path of the wire W along which the wire W is to be wound around the reinforcing bars S is described. The curl guide unit 5A includes a curl guide 50 (first guide) configured to curl the wire W, which are being fed by the first feeding gear 30L and the second feeding gear 30R, and an inductive guide 51 (second guide) configured to guide the wire W delivered from the first guide 50 toward the binding unit 7A.

The first guide 50 has a guide groove 52 configuring the feeding path of the wire W, and a first guide pin 53a and a second guide pin 53b serving as a guide member for curling the wire W in cooperation with the guide groove 52.

The first guide pin 53a is an example of the guide member and is provided at an introduction part-side of the first guide 50, to which the wire W being fed by the first feeding gear 30L and the second feeding gear 30R are introduced, and is arranged at a radially inner side of a loop Ru to be formed by the wire W with respect to the feeding path of the wire W configured by the guide groove 52. The first guide pin 53a is configured to regulate the feeding path of the wire W so that the wire W being fed along the guide groove 52 do not enter the radially inner side of the loop Ru to be formed by the wire W.

The second guide pin 53b is provided at a discharge part-side of the first guide 50, from which the wire W being fed by the first feeding gear 30L and the second feeding gear 30R are discharged, and is arranged at a radially outer side of the loop Ru to be formed by the wire W with respect to the feeding path of the wire W configured by the guide groove 52.

The curl guide unit 5A includes a retraction mechanism 53 configured to retract the first guide pin 53a. The retraction mechanism 53 is configured to be displaced in conjunction with the operation of the binding unit 7A after the wire W is wound around the reinforcing bars S, and to retract the first guide pin 53a from a moving path of the wire W before the wire W is wound on the reinforcing bars S.

The second guide 51 has a third guide part 54 configured to regulate a radial position of the loop Ru, which is formed by the wire W to be wound around the reinforcing bars S, and a fourth guide part 55 configured to regulate a position along an axial direction Ru1 of the loop Ru, which is formed by the wire W to be wound around the reinforcing bars S.

The third guide part 54 has a wall surface 54a that is provided at a radially outer side of the loop Ru, which is formed by the wire W to be wound around the reinforcing bars S, and is configured by a surface extending along the feeding direction of the wire W. When the wire W is wound around the reinforcing bars S, the third guide part 54 regulates a radial position of the loop Ru, which is formed by the wire W to be wound around the reinforcing bars S, by the wall surface 54a.

The fourth guide part 55 is provided at an introduction-side of the wire W and has wall surfaces 55a that are provided at both sides in the axial direction Ru1 of the loop Ru, which is formed by the wire W to be wound around the reinforcing bars S, and are configured by surfaces erecting from the wall surface 54a toward the radially inner side of the loop Ru. When the wire W is wound around the reinforcing bars S, the fourth guide part 55 regulates a position along the axial direction Ru1 of the loop Ru, which is formed by the wire W to be wound around the reinforcing bars S, by the wall surfaces 55a.

Thereby, the wire W delivered from the first guide 50 are guided to the third guide part 54 by the fourth guide part 55 while a position of the axial direction Ru1 of the loop Ru to be formed around the reinforcing bars S is regulated by the wall surfaces 55a of the fourth guide part 55.

In this example, the second guide 51 is supported to the third guide part 54 at a state where the third guide part 54 is fixed to the main body part 10A of the reinforcing bar binding machine 1A and the fourth guide part 55 can rotate about a shaft 55b, which is a support point. The fourth guide part 55 is configured so that an introduction-side, to which the wire W delivered from the first guide 50 is to be introduced, can be opened and closed in directions of separating from and coming close to the first guide 50. Thereby, after binding the reinforcing bars S with the wire W, the fourth guide part 55 is retracted during an operation of pulling out the reinforcing bar binding machine 1A from the reinforcing bars S, so that it possible to easily perform the operation of pulling out the reinforcing bar binding machine 1A from the reinforcing bars S.

Subsequently, the configuration of curling the wire W is described. The wire W that is fed by the first feeding gear 30L and the second feeding gear 30R are curled as the radial position of the loop Ru to be formed by the wire W is regulated at least at three points of two points of the radially outer side of the loop Ru formed by the wire W and one point of the radially inner side between the two points.

In this example, a radially outer position of the loop Ru to be formed by the wire W is regulated at two points of the second wire guide $4A_2$ provided upstream of the first guide pin 53a and the second guide pin 53b provided downstream of the first guide pin 53a with respect to the feeding direction of the wire W that is fed in the forward direction. Also, a radially inner position of the loop Ru to be formed by the wire W is regulated by the first guide pin 53a.

Figure 5:
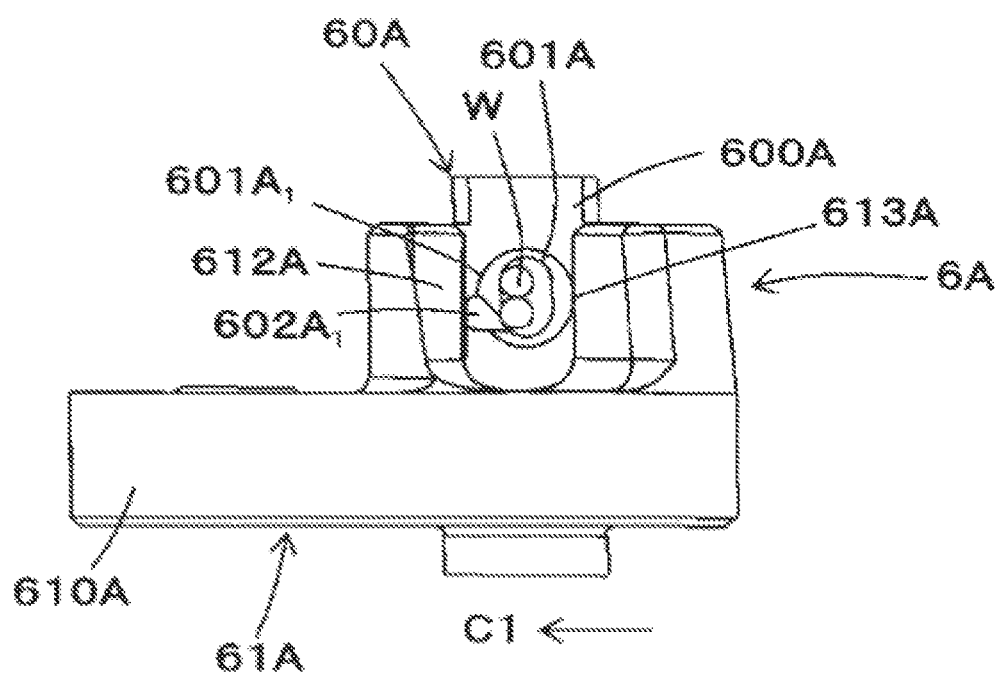
FIG. 5 is a top view depicting an example of a fixed blade part and a moveable blade part of a cutting unit of the embodiment.
Figure 6:
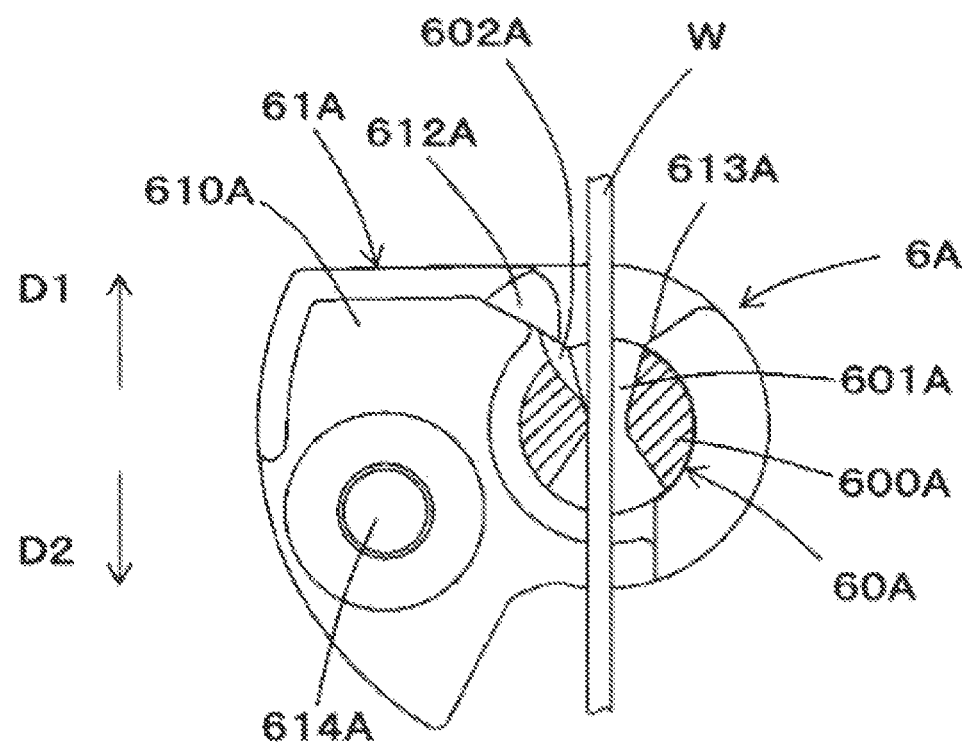
FIG. 6 is a partial side sectional view depicting the example of the fixed blade part and the moveable blade part of the cutting unit of the embodiment.
Figure 7:
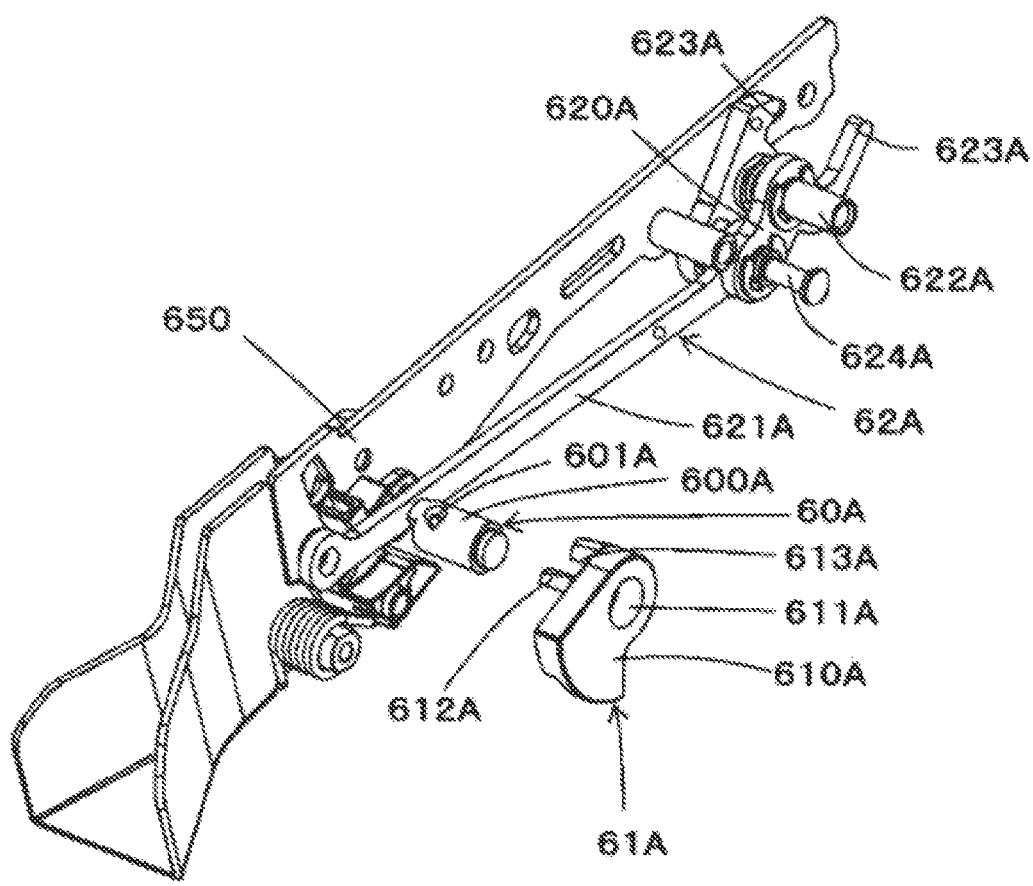
FIG. 7 is an exploded perspective view depicting the example of the cutting unit of the embodiment.
Figure 8:
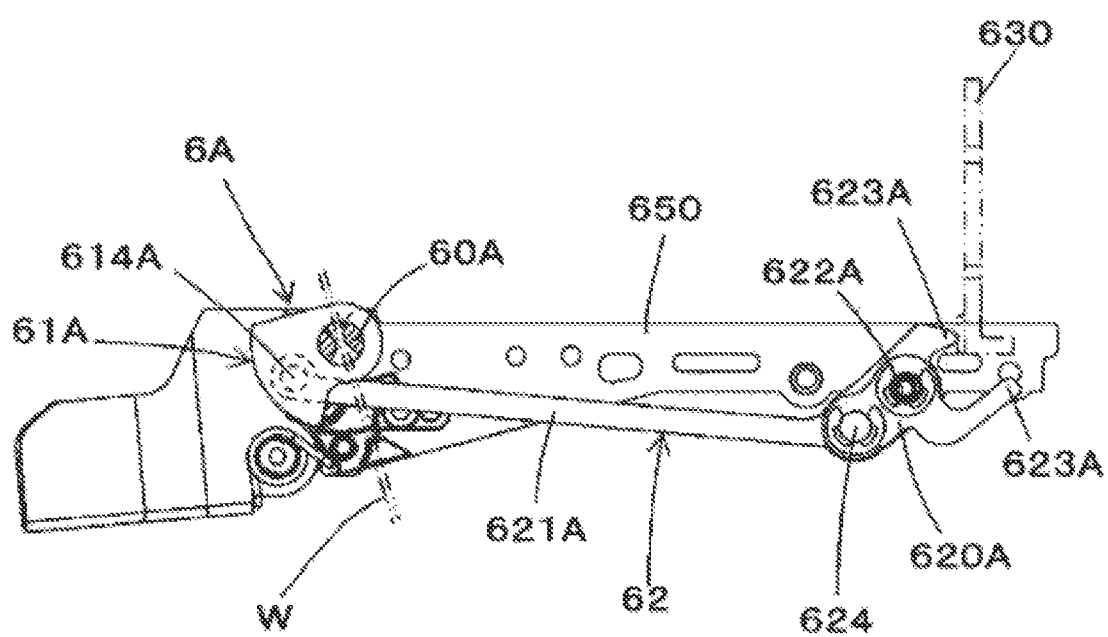
FIG. 8 is a side view depicting the example of the cutting unit of the embodiment.

FIG. 5 is a top view depicting an example of a fixed blade part and a moveable blade part of the cutting unit of the embodiment, FIG. 6 is a partial side sectional view depicting the example of the fixed blade part and the moveable blade part of the cutting unit of the embodiment, FIG. 7 is an exploded perspective view depicting the example of the cutting unit of the embodiment, and FIG. 8 is a side view depicting the example of the cutting unit of the embodiment. In the below, the cutting unit 6A configured to cut the wire W wound on the reinforcing bars S is described.

The cutting unit 6A includes a fixed blade part 60A, a moveable blade part 61A configured to cut the wire W in cooperation with the fixed blade part 60A, and a transmission mechanism 62A configured to transmit an operation of the binding unit 7A to the moveable blade part 61A.

The fixed blade part 60A is an example of the blade part. The fixed blade part 60A has a shaft portion 600A and an opening 601A through which the wire W is to pass.

The shaft portion 600A has a cylindrical shape. An axial end portion of the shaft portion 600A is fixed to a support member 650 shown in FIGS. 7 and 8. The opening 601A is formed to penetrate the shaft portion 600A in a direction perpendicular to the axial direction. The opening 601A has a shape through which the two wires W can pass with being aligned in parallel. In this example, a sectional shape of the opening 601A is a long hole shape in a direction in which the two wires W are aligned in parallel, and a longitudinal direction of the long hole shape is an axial direction of the shaft portion 600A.

The opening 601A has a tapered shape of which an opening area of an introduction-side of the opening 601A becomes larger with respect to the feeding of the wire W in a forward direction denoted with an arrow D1, for example. Also, the opening 601A has a tapered shape of which an opening area of an introduction-side of the opening 601A becomes larger with respect to the feeding of the wire W in a reverse direction denoted with an arrow D2, for example. Thereby, in any case where the wire W having passed through the opening 601A of the fixed blade part 60A is fed in the forward direction or the reverse direction, a situation where the wire W is pressed to an end portion of the introduction-side of the opening 601A and a resistance against the feeding is thus generated is suppressed. The fixed blade part 60A is provided downstream of the second wire guide $4A_2$ with respect to the feeding direction of the wire W to be fed in the forward direction, and the opening 601A configures a third wire guide.

The moveable blade part 61A is an example of the blade part. The moveable blade part 61A has a moveable part main body 610A, a hole portion 611A in which the shaft portion 600A of the fixed blade part 60A is inserted, a shaft support portion 612A configured to support the moveable part main body 610A to the shaft portion 600A, and a moveable blade 613A configured to cut the wire W to pass through the opening 601A of the fixed blade part 60A.

The hole portion 611A is configured as a circular opening conforming to an outer shape of the shaft portion 600A of the fixed blade part 60A, and is formed to penetrate the moveable part main body 610A. The shaft support portion 612A and the moveable blade 613A protrude from one surface of the moveable part main body 610A along the axial direction of the hole portion 611A, in conformity to a position of an inner surface of the hole portion 611A. In the meantime, at a state where the shaft portion 600A of the fixed blade part 60A is inserted in the hole portion 611A of the moveable blade part 61A and the moveable blade part 61A is mounted to the fixed blade part 60A, the axial direction of the shaft portion 600A of the fixed blade part 60A and the axial direction of the hole portion 611A of the moveable blade part 61A are parallel with each other and substantially coincides with each other.

When the shaft portion 600A of the fixed blade part 60A is inserted in the hole portion 611A, the moveable blade part 61A is mounted to the fixed blade part 60A so that it can rotate relative to the fixed blade part 60A about the shaft portion 600A, which is a support point.

At a state where the shaft portion 600A of the fixed blade part 60A is inserted in the hole portion 611A of the moveable blade part 61A, the moveable blade 613A is provided at a position following an outer peripheral surface of the shaft portion 600A of the fixed blade part 60A and extends along the axial direction of the shaft portion 600A of the fixed blade part 60A.

The moveable blade 613A is configured to circumferentially move along a circumferential surface of the shaft portion 600A in directions of opening and closing the opening 601A of the fixed blade part 60A by the rotating operation of the moveable blade part 61A about the shaft portion 600A of the fixed blade part 60A, which is a support point. The moving direction of the moveable blade 613A relative to the opening 601A is perpendicular to a longitudinal direction of the opening 601A having a long hole shape.

The moveable blade 613A of the moveable blade part 61A is configured to sliding contact one opening end of the opening 601A of the fixed blade part 60A by the rotating operation about the fixed blade part 60A, which is a support point. During a cutting operation of the wire W, the moveable blade 63A is moved in an arrow C1 direction. When the moveable blade 613A is moved in the arrow C1 direction, the wire W having passed through the opening 601A is put (interposed) between the opening 601A of the fixed blade part 60A and the moveable blade 613A of the moveable blade part 61A. The wire W put between the fixed blade part 60A and the moveable blade part 61A are pressed in the arrow C1 direction by the moveable blade 613A, and are pressed to an end edge portion 601A$_1$, which configures a blade of the fixed blade part 60A, of the opening 601A. Then, the moveable blade 613A of the moveable blade part 61A is sliding contacted to the end edge portion 601A$_1$ of the fixed blade part 60A and the moveable blade 613A is further moved in the arrow C1 direction, so that a force of shearing the wire W is applied and the wire W is thus cut.

Subsequently, a configuration of a delay part configured to delay a timing at which the cutting is to start for one wire W of the two wires W as compared to a timing at which the cutting is to start for the other wire W so as to reduce the load is described.

The fixed blade part 60A has an escape part 602A$_1$ as a delay part configured to escape one wire W with respect to the moveable blade part 61A and to thereby delay a timing of the cutting start during an operation of cutting the two wires W with the moveable blade part 61A.

The escape part 602A$_1$ is provided (located) by forming a concave part having a shape, into which a part of one wire W is to enter, at the end edge portion 601A$_1$, to which one wire W is to be pressed, of the opening end of the opening 601A to which the wire W is to be pressed during the movement of the moveable blade part 61A in the arrow C1 direction.

Subsequently, a configuration of operating the moveable blade part 61A is described. The transmission mechanism 62A includes a first link 620A to which the operation of the binding unit 7A is to be transmitted, and a second link 621A configured to transmit an operation of the first link 620A to the moveable blade part 61A.

The first link 620A is rotatably supported to a shaft 622A of the support member 650. The first link 620A has a pressed part 623A, to which the operation of the binding unit 7A is to be transmitted, at one end portion with the shaft 622A being interposed therebetween. Also, the first link 620A has a shaft 624A configured to rotatably support the second link 621A at the other end portion with the shaft 622A being interposed therebetween.

The second link 621A is coupled at one end portion to the moveable blade part 61A to be rotatable about a shaft 614A of the moveable blade part 61A, which is a support point. The shaft 614A of the moveable blade part 61A is provided at a position distant from the hole portion 611A by a predetermined length, in which the shaft portion 600A of the fixed blade part 60A, which is a support point of the rotating operation of the moveable blade part 61A, is to be inserted. Also, the second link 621A is coupled at the other end portion to the first link 620A to be rotatable about the shaft 624A, which is a support point.

The transmission mechanism 62A is configured so that the operation of the binding unit 7A is transmitted to the first link 620A through the transmission member 630 and the first link 620A is thus rotated about the shaft 622A, which is a support point. The transmission mechanism 62A is configured so that the rotating operation about the shaft 622A of the first link 620A, which is a support point, is transmitted to the moveable blade part 61A through the second link 621A and the moveable blade part 61A is thus rotated about the fixed blade part 60A, which is a support point. Thereby, the wire W having passed through the opening 601A of the fixed blade part 60A are cut by the moveable blade part 61A.

Figure 9A:
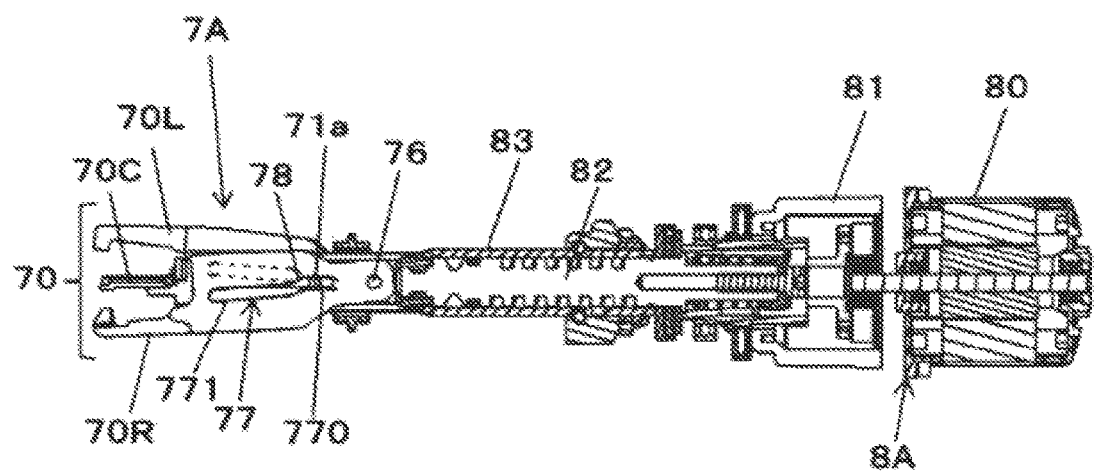
FIGS. 9A and 9B are views depicting an example of a binding unit.
Figure 9B:
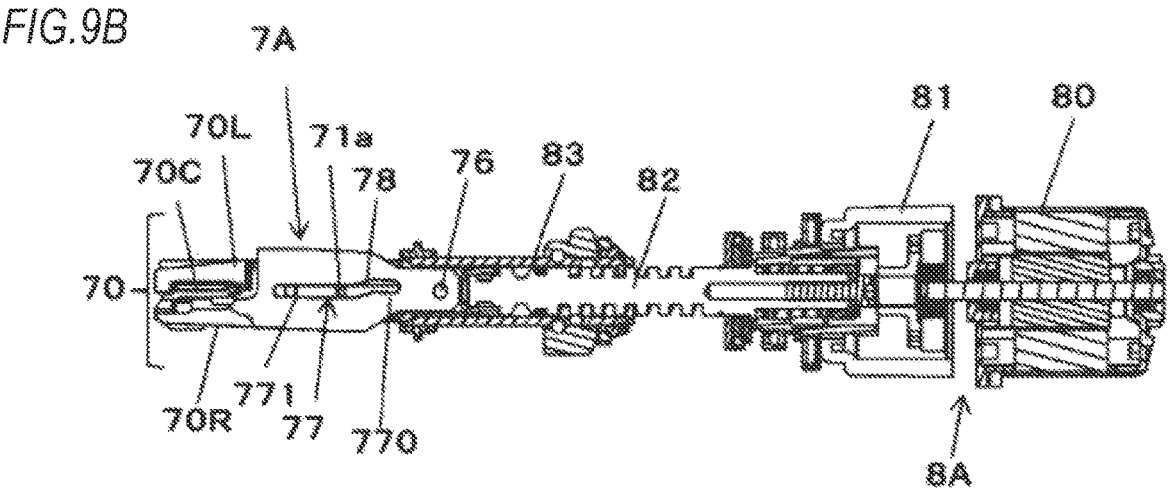
Figure 10:
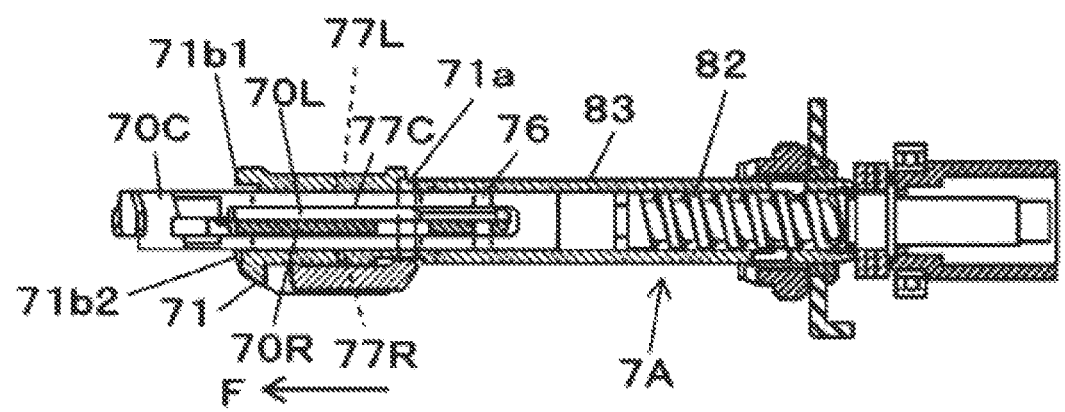
FIG. 10 is a view depicting the example of the binding unit.

FIGS. 9 and 10 depict an example of the binding unit. In the below, the binding unit 7A configured to bind the reinforcing bars S with the wire W is described.

The binding unit 7A includes a gripping part 70 configured to grip the wire W, and a bending part 71 configured to bend one end portion WS and the other end portion WE of the wire W toward the reinforcing bars S.

The gripping part 70 includes a fixed gripping member 70C, a first moveable gripping member 70L, and a second moveable gripping member 70R. The first moveable gripping member 70L and the second moveable gripping member 70R are arranged at left and right sides with the fixed gripping member 70C being interposed therebetween. Specifically, the first moveable gripping member 70L is arranged at one side along the axial direction of the wire W to be wound and the second moveable gripping member 70R is arranged at the other side, with respect to the fixed gripping member 70C.

The first moveable gripping member 70L and the fixed gripping member 70C are configured so that the wire W is to pass between tip ends of the first moveable gripping member 70L and the fixed gripping member 70C. Also, the second moveable gripping member 70R and the fixed gripping member 70C are configured so that the wire W is to pass between tip ends of the second moveable gripping member 70R and the fixed gripping member 70C.

The fixed gripping member 70C has a shaft 76 configured to rotatably support the first moveable gripping member 70L and the second moveable gripping member 70R. The fixed gripping member 70C is configured to support rear ends of the first moveable gripping member 70L and the second moveable gripping member 70R with the shaft 76. Thereby, the first moveable gripping member 70L is opened and closed in directions in which the tip end thereof separates from and comes close to the fixed gripping member 70C by a rotating operation about the shaft 76, which is a support point. Also, the second moveable gripping member 70R is opened and closed in directions in which the tip end thereof separates from and comes close to the fixed gripping member 70C by a rotating operation about the shaft 76, which is a support point.

The bending part 71 has a shape covering a periphery of the gripping part 70 and is provided to be moveable along an axial direction of the binding unit 7A. The bending part 71 has an opening and closing pin 71a configured to open and close the first moveable gripping member 70L and the second moveable gripping member 70R. The first moveable gripping member 70L and the second moveable gripping member 70R have an opening and closing guide hole 77 configured to open and close the first moveable gripping member 70L and the second moveable gripping member 70R by an operation of the opening and closing pin 71a, respectively.

The opening and closing pin 71a passes through an inside of the bending part 71 and is perpendicular to a moving direction of the bending part 71. The opening and closing pin 71a is fixed to the bending part 71, and is configured to move in conjunction with movement of the bending part 71.

The opening and closing guide hole 77 extends in a moving direction of the opening and closing pin 71a, and has an opening and closing portion 78 configured to convert linear movement of the opening and closing pin 71a into an opening and closing operation resulting from the rotation of the second moveable gripping member 70R about the shaft 76, which is a support point. The opening and closing guide hole 77 has a first standby portion 770 extending in the moving direction of the bending part 71 by a first standby distance, and a second standby portion 771 extending in the moving direction of the bending part 71 by a second standby distance. The opening and closing portion 78 extends with being bent obliquely outward from one end portion of the first standby portion 770, and couples to the second standby portion 771. Meanwhile, in FIGS. 9A and 9B, the opening and closing guide hole 77 provided to the second moveable gripping member 70R is shown. However, the first moveable gripping member 70L is also provided with the opening and closing guide hole 77 having a bilaterally symmetric shape.

As shown in FIG. 9A, as the first moveable gripping member 70L and the second moveable gripping member 70R move in the directions of getting away from the fixed gripping member 70C, the gripping part 70 is formed with a feeding path through which the wire W is to pass between the first moveable gripping member 70L and the fixed gripping member 70C and between the second moveable gripping member 70R and the fixed gripping member 70C.

The wire W that is fed by the first feeding gear 30L and the second feeding gear 30R passes between the fixed gripping member 70C and the second moveable gripping member 70R and are guided to the curl guide unit 5A. The wire W curled by the curl guide unit 5A passes between the fixed gripping member 70C and the first moveable gripping member 70L.

A side of the reinforcing bar binding machine 1A at which the curl guide unit 5A shown in FIG. 1 is provided is referred to a front side. When the bending part 71 is moved in a forward direction denoted with an arrow F in FIG. 10 and the opening and closing pin 71a thus pushes the opening and closing portion 78 of the opening and closing guide hole 77, the first moveable gripping member 70L and the second moveable gripping member 70R are moved in the directions of coming close to the fixed gripping member 70C by the rotating operation about the shaft 76, which is a support point.

As shown in FIG. 9B, the first moveable gripping member 70L is moved in the direction of coming close to the fixed gripping member 70C, so that the wire W is gripped between the first moveable gripping member 70L and the fixed gripping member 70C. Also, the second moveable gripping member 70R is moved in the direction of coming close to the fixed gripping member 70C, so that a gap in which the wire W can be fed is formed at a portion through which the wire W is to pass between the second moveable gripping member 70R and the fixed gripping member 70C.

The bending part 71 has a bending portion 71b1 configured to push one end portion WS of the wire W gripped between the first moveable gripping member 70L and the fixed gripping member 70C. Also, the bending part 71 has a bending portion 71b2 configured to push the other end portion WE of the wire W gripped between the second moveable gripping member 70R and the fixed gripping member 70C.

The bending part 71 is moved in the forward direction denoted with the arrow F, so that one end portion WS of the wire W gripped by the fixed gripping member 70C and the first moveable gripping member 70L are pushed by the bending portion 71b1 and are thus bent toward the reinforcing bars S. Also, the bending part 71 is moved in the forward direction denoted with the arrow F, so that the other end portion WE of the wire W having passed between the fixed gripping member 70C and the second moveable gripping member 70R are pushed by the bending portion 71b1 and are thus bent toward the reinforcing bars S.

As shown in FIG. 2, the binding unit 7A includes a length regulation part 74 configured to regulate positions of one end portion WS of the wire W. The length regulation part 74 is configured by providing a member, to which one end portion WS of the wire W is to be butted, on the feeding path of the wire W having passed between the fixed gripping member 70C and the first moveable gripping member 70L.

Also, the binding unit 7A includes a rotary shaft 82, a moveable member 83, which is an operated member configured to be displaced by a rotating operation of the rotary shaft 82, and a rotation regulation member 84 configured to regulate rotation of the moveable member 83 coupled to the rotating operation of the rotary shaft 82. Also, the reinforcing bar binding machine 1A includes a drive unit 8A configured to drive the binding unit 7A. The drive unit 8A includes a motor 80, and a decelerator 81 for deceleration and torque amplification. The rotary shaft 82 is driven by the motor 80 via the decelerator 81.

The rotary shaft 82 and the moveable member 83 are configured so that the rotating operation of the rotary shaft 82 is converted into movement in a front and back direction along the rotary shaft 82 of the moveable member 83 by a screw part provided to the rotary shaft 82 and a nut part provided to the moveable member 83. The binding unit 7A has the bending part 71 integrated with the moveable member 83, so that the movement of the moveable member 83 in the front and back direction causes the bending part 71 to move in the front and back direction.

In an operation area in which the wire W is gripped by the gripping part 70 and the wire W is bent by the bending part 71, the moveable member 83, the bending part 71, and the gripping part 70 supported to the bending part 71 are engaged with the rotation regulation member 84, and are thus moved in the front and back direction with the rotating operation being regulated by the rotation regulation member 84. Also, when the moveable member 83, the bending part 71 and the gripping part 70 are disengaged from the rotation regulation member 84, they are rotated by the rotating operation of the rotary shaft 82.

The gripping part 70 is configured so that the fixed gripping member 70C, the first moveable gripping member 70L and the second moveable gripping member 70R gripping the wire W is rotated in conjunction with the rotation of the moveable member 83 and the bending part 71.

The retraction mechanism 53 of the first guide pin 53a is configured by a link mechanism configured to convert the movement of the moveable member 83 in the front and back direction into the displacement of the first guide pin 53a. Also, the cutting unit 6A is configured so that the movement of the moveable member 83 is transmitted to the transmission mechanism 62A by the transmission member 630A and the moveable blade part 61A is thus rotated.

Subsequently, a shape of the reinforcing bar binding machine 1A is described. The reinforcing bar binding machine 1A is used with being gripped by an operator's hand, and has a main body part 10A and a handle part 11A. The first guide 50 and the second guide 51 of the curl guide unit 5A of the reinforcing bar binding machine 1A are provided at a front end portion of the main body part 10A. Also, the wire feeding unit 3A, the cutting unit 6A, the binding unit 7A, the drive unit 8A, and the like of the reinforcing bar binding machine 1A are accommodated in the main body part 10A. Also, the handle part 11A of the reinforcing bar binding machine 1A extends in one direction from the main body part 10A. Also, the magazine 2A of the reinforcing bar binding machine 1A is provided in front of the handle part 11A.

Subsequently, an operation unit of the reinforcing bar binding machine 1A is described. The handle part 11A of the reinforcing bar binding machine 1A is provided at a front side with a trigger 12A. In correspondence to a state of a switch 13A that is pressed when the trigger 12A is operated, a control unit 14A controls the feeding motor 33 and the motor 80. Also, a battery 15A is detachably mounted to a lower part of the handle part 11A.

Example of Operation of Reinforcing Bar Binding Machine of Embodiment

FIGS. 11A to 11D illustrate an example of an operation of gripping and twisting the wires in detail. In the below, an operation of binding the reinforcing bars S with the two wires W by the reinforcing bar binding machine 1A of the embodiment is described with reference to each drawing.

The reinforcing bar binding machine 1A is in a standby state where the wire W are sandwiched between the first feeding gear 30L and the second feeding gear 30R, and the tip end of the wire W is positioned from the sandwiching position between the first feeding gear 30L and the second feeding gear 30R to the fixed blade part 60 of the cutting unit 6A. Also, as shown in FIG. 9A, when the reinforcing bar binding machine 1A is in the standby state, the first moveable gripping member 70L opens with respect to the fixed gripping member 70C and the second moveable gripping member 70R opens with respect to the fixed gripping member 70C.

When the reinforcing bars S are inserted between the first guide 50 and the second guide 51 of the curl guide unit 5A and the trigger 12A is operated, the feeding motor 33 is driven in the forward rotation direction, so that the first feeding gear 30L is rotated in the forward direction and the second feeding gear 30R is also rotated in the forward direction in conjunction with the first feeding gear 30L. Thereby, the two wires W sandwiched between the first feeding gear 30L and the second feeding gear 30R are fed in the forward direction.

The first wire guide $4A_1$ is provided upstream of the wire feeding unit 3A and the second wire guide $4A_2$ is provided downstream of the wire feeding unit 3A with respect to the feeding direction of the wire W to be fed in the forward direction, so that the two wires W are fed with being aligned in parallel.

When the wire W is fed in the forward direction, the wire W passes between the fixed gripping member 70C and the second moveable gripping member 70R and pass through the guide groove 52 of the first guide 50 of the curl guide unit 5A. Thereby, the wire W is guided (supported) by the second wire guide $4A_2$, and the wire W is curled to be wound around the reinforcing bars S at two points of the first guide pin 53a and the second guide pin 53b of the first guide 50.

Figure 11A:
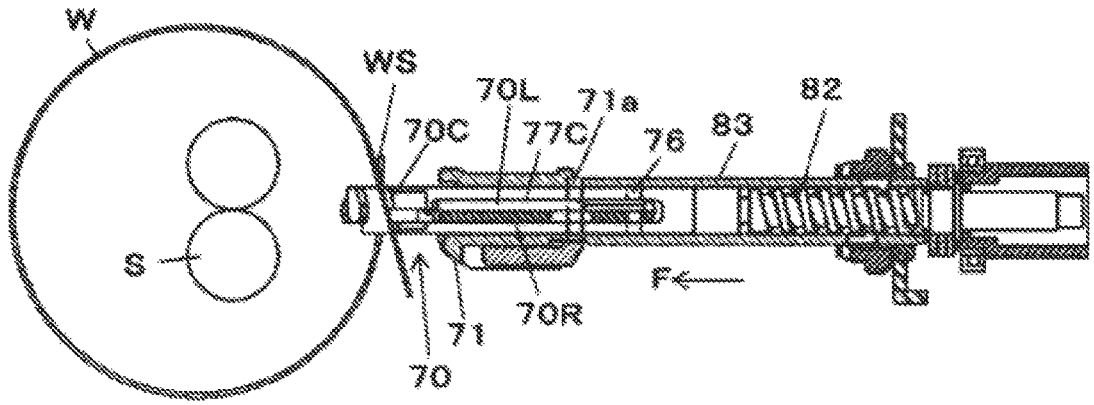
FIGS. 11A to 11D illustrate an example of an operation of gripping and twisting wires in detail.

The wire W delivered from the first guide 50 is guided between the fixed gripping member 70C and the first moveable gripping member 70L by the second guide 51. Then, when the tip ends of the wire W is fed to positions at which the tip ends are butted to the length regulation part 74, the driving of the feeding motor 33 is stopped. Thereby, as shown in FIG. 11A, the wire W is wound in a loop shape around the reinforcing bars S.

After stopping the feeding of the wire W, the motor 80 is driven in the forward rotation direction, so that the motor 80 moves the moveable member 83 in the arrow F direction, which is a forward direction. That is, a rotating operation of the moveable member 83 coupled to the rotation of the motor 80 is regulated by the rotation regulation member 84, so that the rotation of the motor 80 is converted into the linear movement. Thereby, the moveable member 83 is moved forward.

In conjunction with the forward movement of the moveable member 83, the bending part 71 is moved forward integrally with the moveable member 83, without being rotated. When the bending part 71 is moved forward, the opening and closing pin 71a passes through the opening and closing portion 78 of the opening and closing guide hole 77, as shown in FIG. 9B.

Thereby, the first moveable gripping member 70L is moved in the direction of coming close to the fixed gripping member 70C through the rotating operation about the shaft 76, which is a support point. Therefore, one end portion WS of the wire W is gripped between the first moveable gripping member 70L and the fixed gripping member 70C. Also, the second moveable gripping member 70R is moved in the direction of coming close to the fixed gripping member 70C through the rotating operation about the shaft 76, which is a support point. Therefore, a gap in which the wire W can be fed is formed at a portion through which the wire W is to pass between the second moveable gripping member 70R and the fixed gripping member 70C.

Also, when the moveable member 83 is moved forward, the operation of the moveable member 83 is transmitted to the retraction mechanism 53, so that the first guide pin 53a is retracted.

After advancing the moveable member 83 to a position at which the wire W is gripped through the opening and closing operation of the first moveable gripping member 70L and the second moveable gripping member 70R, the rotation of the motor 80 is temporarily stopped and the feeding motor 33 is driven in the reverse rotation direction. Thereby, the first feeding gear 30L is reversed, and the second feeding gear 30R is also reversed in conjunction with the first feeding gear 30L.

Figure 11B:
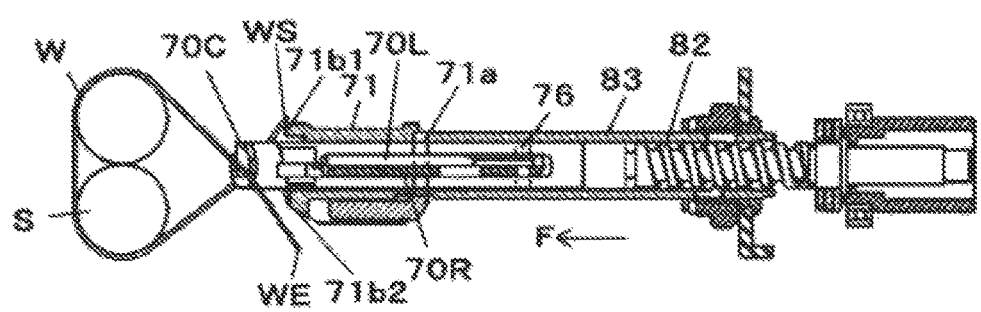

Therefore, the wires S sandwiched between the first feeding gear 30L and the second feeding gear 30R are fed in the reverse direction. During the operation of feeding the wire W in the reverse direction, the wire W is wound on the reinforcing bars S with being closely contacted thereto, as shown in FIG. 11B.

After winding the wire W on the reinforcing bars S and stopping the driving of the feeding motor 33 in the reverse rotation direction, the motor 80 is driven in the forward rotation direction, so that the moveable member 83 is moved forward. The forward moving operation of the moveable member 83 is transmitted to the cutting unit 6A by the transmission mechanism 62A, so that the moveable blade part 61A is rotated and the other end portion WE of the wire W gripped with the second moveable gripping member 70R and the fixed gripping member 70C are cut by the operation of the fixed blade part 60A and the moveable blade part 61A.

When binding the reinforcing bars S with the two wires W, like this example, it is possible to secure the strength equivalent to the case where the reinforcing bars S are bound with one wire even when making a diameter of the respective wire W thinner. For this reason, it is possible to easily bend the wire W and to bring the wire W into close contact with the reinforcing bars S with the lower force. Therefore, it is possible to wind the wire W on the reinforcing bars S with the lower force. Also, it is possible to reduce the load when cutting the wire W. Accompanied by this, it is possible to miniaturize each motor and the mechanism part of the reinforcing bar binding machine 1A, thereby miniaturizing the entire main body part. Also, the motor is miniaturized and the load is reduced, so that it is possible to reduce the power consumption.

Figure 11C:
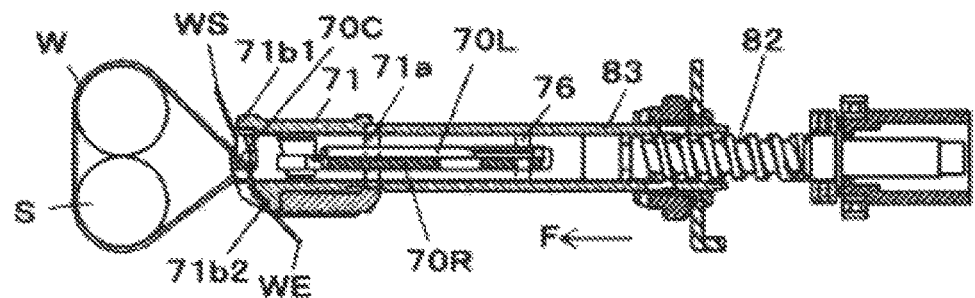

After cutting the wire W, the moveable member 83 is further moved forward, so that the bending part 71 is moved forward integrally with the moveable member 83, as shown in FIG. 11C. The bending part 71 is moved in the direction of coming close to the reinforcing bars S, which is the forward direction denoted with the arrow F, so that one end portion WS of the wire W gripped with the fixed gripping member 70C and the first moveable gripping member 70L are pressed toward the reinforcing bars S by the bending portion 71b1, and are bent toward the reinforcing bars S at the gripping position, which is a support point. The bending part 71 is further moved forward, so that one end portion WS of the wire W is held with being gripped between the first moveable gripping member 70L and the fixed gripping member 70C.

Also, the bending part 71 is moved in the direction of coming close to the reinforcing bars S, which is the forward direction denoted with the arrow F, so that the other end portion WE of the wire W gripped with the fixed gripping member 70C and the second moveable gripping member 70R are pressed toward the reinforcing bars S by the bending portion 71b2, and are bent toward the reinforcing bars S at the gripping position, which is a support point. The bending part 71 is further moved forward, so that one end portion WE of the wire W is supported between the second moveable gripping member 70R and the fixed gripping member 70C.

After bending the end portion of the wire W toward the reinforcing bars S, the motor 80 is further driven in the forward rotation direction, so that the motor 80 further moves the moveable member 83 in the forward direction denoted with the arrow F. The moveable member 83 is moved to a predetermined position in the arrow F direction, so that the moveable member 83 is disengaged from the rotation regulation member 84 and the rotation regulation state of the moveable member 83 by the rotation regulation member 84 is released.

Figure 11D:
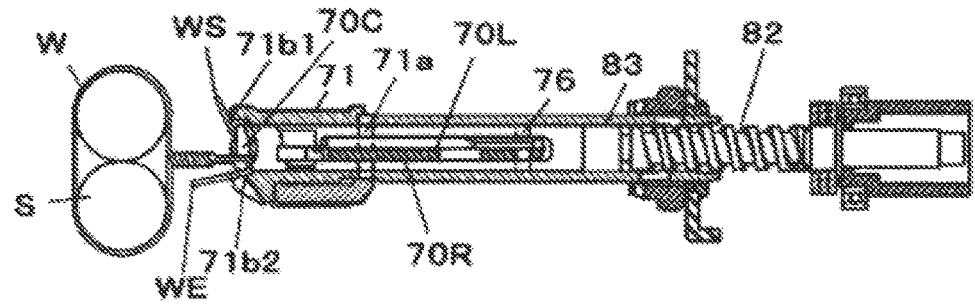

Thereby, the motor 80 is further driven in the forward rotation direction, so that the gripping part 70 gripping the wire W is rotated integrally with the bending part 71 and twists the wire W, as shown in FIG. 11D.

After twisting the wire W, the motor 80 is driven in the reverse rotation direction, so that the motor 80 moves the moveable member 83 in a backward direction denoted with an arrow R. That is, the rotating operation of the moveable member 83 coupled to the rotation of the motor 80 is regulated by the rotation regulation member 84, so that the rotation of the motor 80 is converted into the linear movement.

Thereby, the moveable member 83 is moved backward. As the moveable member 83 is moved backward, the first moveable gripping member 70L and the second moveable gripping member 70R are displaced in the directions of separating from the fixed gripping member 70C, so that the gripping part 70 releases the wire W.

FIGS. 12 and 13 illustrate the operation of cutting the wires in detail. In the below, the operation of cutting the wire W with the cutting unit 6A is described in detail.

The cutting unit 6A is configured so that the operation of the moveable member 83 is transmitted to the first link 620A of the transmission mechanism 62A by the transmission member 630, the transmission member 630 is moved in the arrow F direction, the pressed part 623A of the first link 620A is pressed and the first link 620A is thus rotated about the shaft 622A, which is a support point, in an arrow C11 direction.

The cutting unit 6A is configured so that the rotating operation about the shaft 622A of the first link 620A, which is a support point, is transmitted to the moveable blade part 61A through the second link 621A and the moveable blade part 61A is thus rotated about the fixed blade part 60A, which is a support point, in the arrow C1 direction.

Figure 13A:
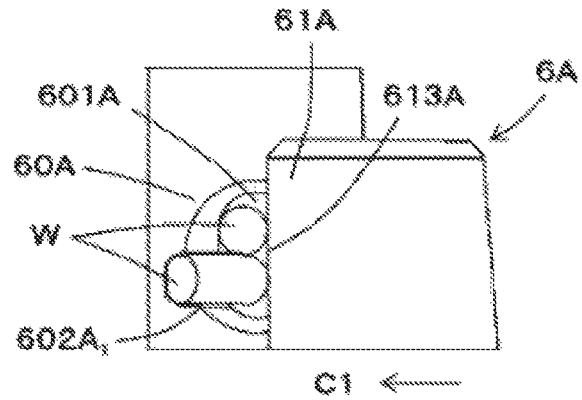
FIGS. 13A to 13D illustrates the operation of cutting the wires in detail.

When the moveable blade part 61A is rotated in the arrow C1 direction, the wire W having passed through the opening 601A of the fixed blade part 60A is pressed to the opening end of the opening 601A by the moveable blade 613A. One wire W of the two wires W aligned in parallel enters the escape part $602A_1$ of the fixed blade part 60A. Thereby, as shown in FIG. 13A, the other wire W, which is pressed to the end edge portion $601A_1$ of the fixed blade part 60A through the operation of the moveable blade 613A, is ahead cut.

Figure 13B:
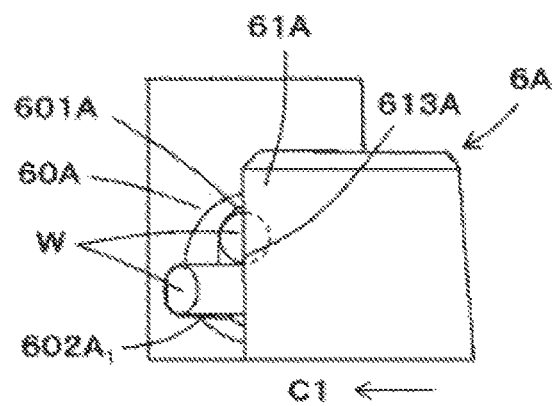

After the cutting of the other wire W starts, when the other wire W is cut to a predetermined position, one wire W is pressed to the end edge portion of the escape part $602A_1$ of the fixed blade part 60A through the operation of the moveable blade 613A. Thereby, as shown in FIG. 13B, one wire W starts to be cut. In this example, a shape of the escape part $602A_1$ is set so that after the cutting of the other wire W starts, when the other wire W is cut by a radial half or larger, the cutting of one wire W starts. That is, a distance from the opening 601A to the end edge portion of the escape part $602A_1$ is set to a substantial half of the diameter of the wire W.

Figure 12A:
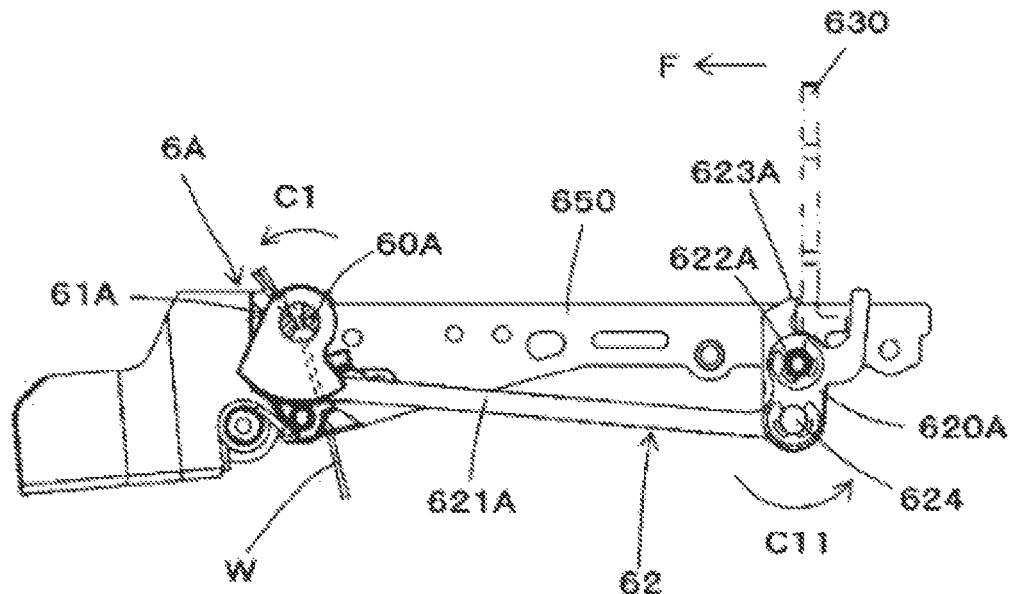
FIGS. 12A and 12B illustrate an operation of cutting the wires in detail.
Figure 12B:
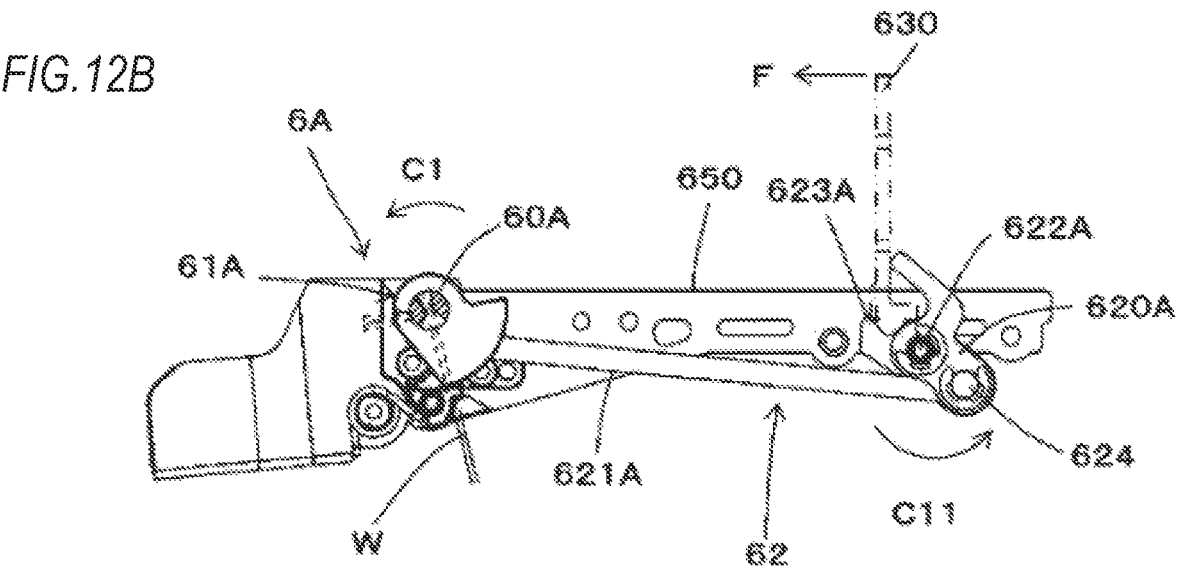
Figure 13C:
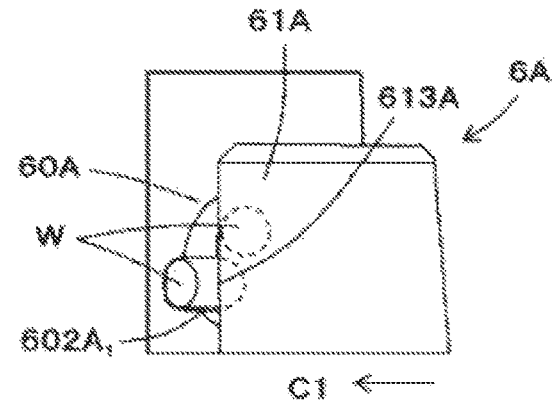
Figure 13D:
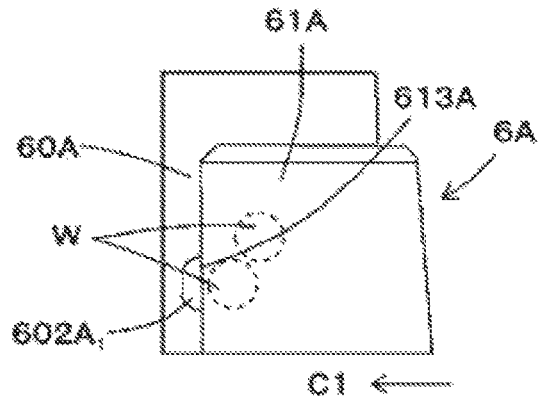

As shown in FIG. 12A, when the moveable blade part 61A is further rotated in the arrow C1 direction, the cutting of the other wire W for which the cutting has ahead started is completed, as shown in FIG. 13C. Then, as shown in FIG. 12B, when the moveable blade part 61A is further rotated in the arrow C1 direction, the cutting of one wire W for which the cutting has started with a delay is completed, as shown in FIG. 13D.

During an operation of cutting the wire W having a circular section, the load is highest when the blade part reaches a diameter position. Therefore, in the configuration of cutting the two wires W aligned in parallel, a difference is set between the timings at which the cutting of the wire W starts. First, after starting to cut the first wire W, when the wire W is cut to a position of a radial half or larger, the cutting of the second wire W starts.

As compared to the cutting of the two wires W aligned in parallel, the load is reduced when one wire W is cut. Thereby, the cutting of one wire W starts ahead, so that the load is reduced. Also, the load is reduced in the case where after the first wire W is cut to a position of the radial half or greater and the position at which the load is highest is passed, the cutting of the second wire W starts, so that the two wires W are cut. Also, the cutting of the second wire W starts earlier than the cutting completion of the first wire W, so that it is possible to suppress an increase in time necessary for the cutting.

As described above, since it is possible to reduce the load upon the cutting of the two wires W, it is possible to miniaturize each motor and the mechanism part of the reinforcing bar binding machine 1A, thereby miniaturizing the entire main body part. Also, the motor is miniaturized and the load is reduced, so that it is possible to reduce the power consumption.

Modified Embodiments of Reinforcing Bar Binding Machine of Embodiment

FIGS. 14 to 19 are top views depicting other examples of the fixed blade part and the moveable blade part of the cutting unit of the embodiment. In the below, the other embodiments of the fixed blade part and the moveable blade part are described.

Figure 14:
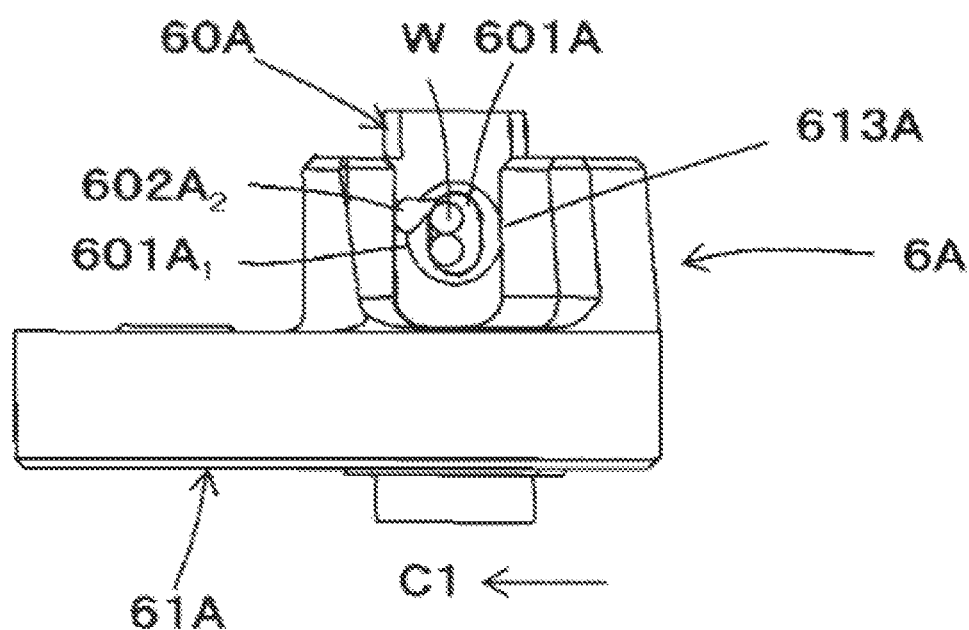
FIG. 14 is a top view depicting another example of the fixed blade part and the moveable blade part of the cutting unit of the embodiment.

The cutting unit 6A shown in FIG. 14 has the escape part of the wire W provided at the fixed blade part 60A, similarly to FIG. 5, and also has an escape part $602A_2$ configured to escape the other wire W to the moveable blade part 61A.

The escape part $602A_2$ is provided by forming a concave part having a shape, into which a part of the other wire W is to enter, at the end edge portion $601A_1$, to which the other wire W is to be pressed, of the opening end of the opening 601A to which the wire W is to be pressed during the movement of the moveable blade part 61A in the arrow C1 direction. In the cutting unit 6A of FIG. 14, it is possible to delay the timing at which the cutting of the other wire W starts, as compared to the timing at which the cutting of one wire W starts.

Figure 15:
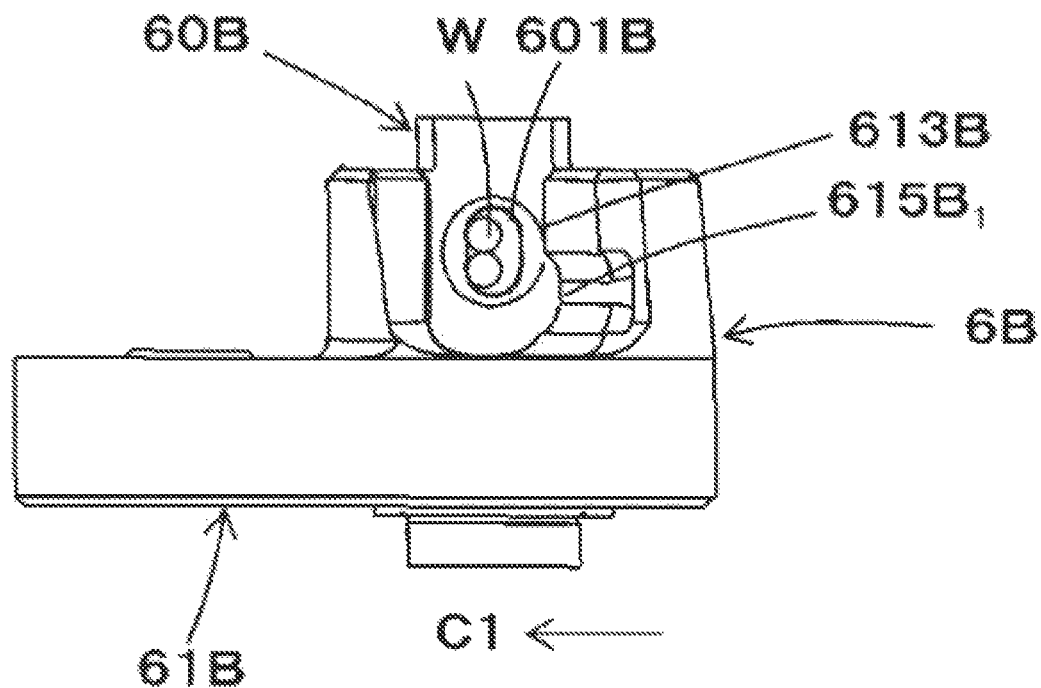
FIG. 15 is a top view depicting another example of the fixed blade part and the moveable blade part of the cutting unit of the embodiment.
Figure 16:
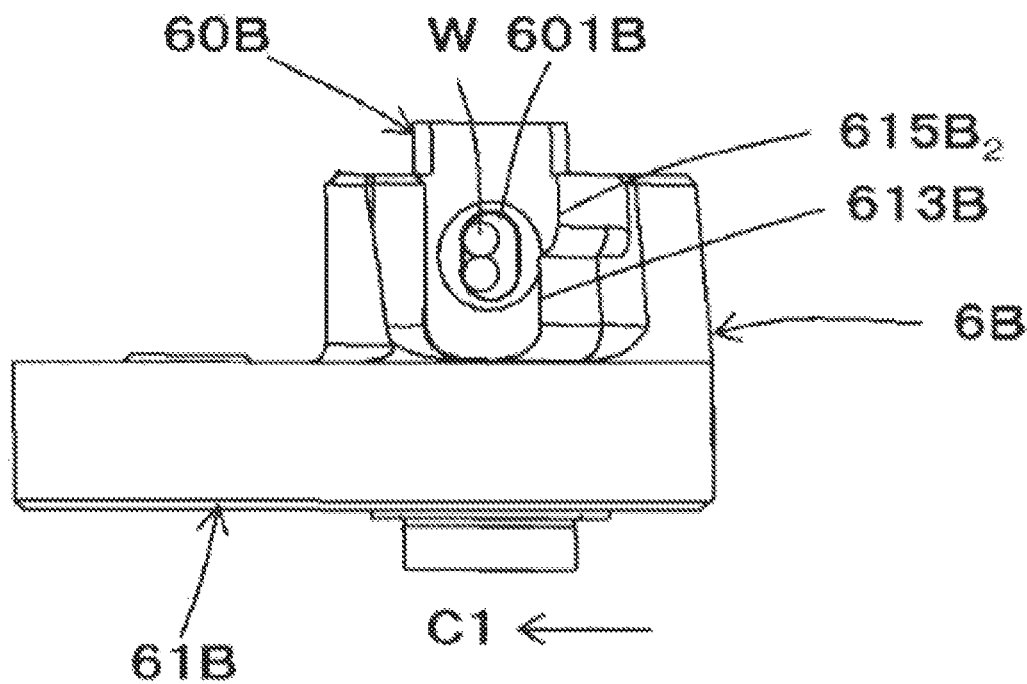
FIG. 16 is a top view depicting another example of the fixed blade part and the moveable blade part of the cutting unit of the embodiment.

A cutting unit 6B shown in FIGS. 15 and 16 includes a fixed blade part 60B having an opening 601B through which the wire W is to pass, and a moveable blade part 61B mounted to be rotatable about the fixed blade part 60B, which is a shaft, and having a moveable blade 613B. A sectional shape of the opening 601B is a long hole shape through which the two wires W can pass with aligned in parallel, for example. The cutting unit 6B is not provided with the escape part at the opening 601B of the fixed blade part 60B.

In contrast, the cutting unit 6B is provided with the escape part at the moveable blade part 61B. An escape part $615B_1$ shown in FIG. 15 is provided by recessing a part of the moveable blade 613B located at a position at which one wire W is contacted, as compared to a part located at a position at which the other wire W is contacted, with respect to the moving direction of the moveable blade part 61B shown with the arrow C1 and thereby forming a crank-shaped step at the moveable blade 613B. A recessed amount of the escape part $615B_1$ is about a half of the diameter of the wire W, for example. In the cutting unit 6B of FIG. 15, it is possible to delay the timing at which the cutting of one wire W starts, as compared to the timing at which the cutting of the other wire W starts.

An escape part $615B_2$ shown in FIG. 16 is provided by recessing a part of the moveable blade 613B located at a position at which the other wire W is contacted, as compared to a part located at a position at which one wire W is contacted, with respect to the moving direction of the moveable blade part 61B shown with the arrow C1 and thereby forming a crank-shaped step at the moveable blade 613B. A recessed amount of the escape part $615B_2$ is about a half of the diameter of the wire W, for example. In the cutting unit 6B of FIG. 16, it is possible to delay the timing at which the cutting of the other wire W starts, as compared to the timing at which the cutting of one wire W starts.

Figure 17:
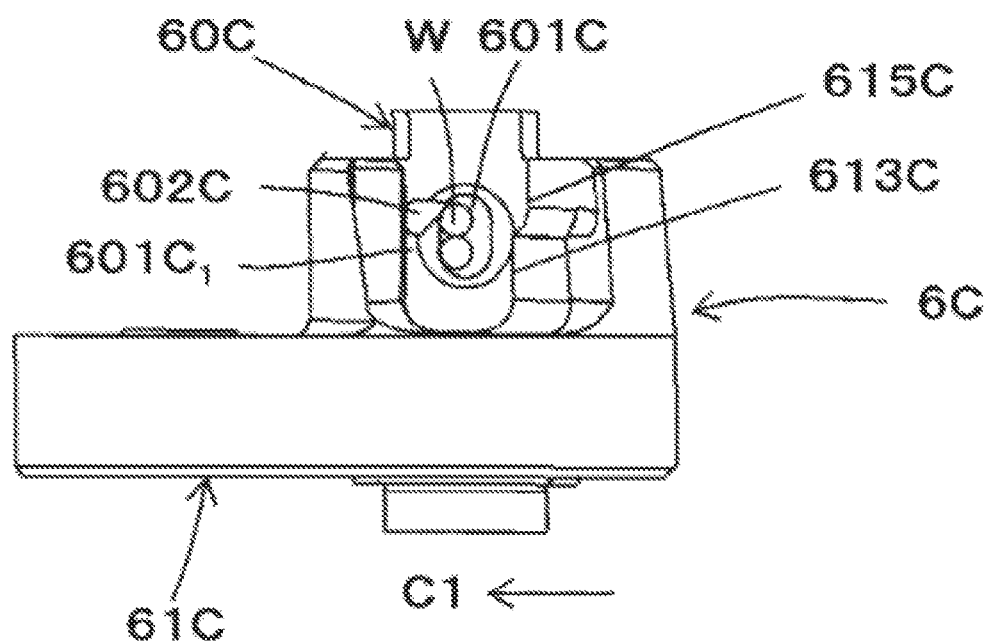
FIG. 17 is a top view depicting another example of the fixed blade part and the moveable blade part of the cutting unit of the embodiment.

A cutting unit 6C shown in FIG. 17 includes a fixed blade part 60C having an opening 601C through which the wire W is to pass, and a moveable blade part 61C mounted to be rotatable about the fixed blade part 60C, which is a shaft, and having a moveable blade 613C. A sectional shape of the opening 601C is a long hole shape through which the two wires W can pass with aligned in parallel, for example. The cutting unit 6C has a configuration where both the fixed blade part 60C and the moveable blade part 61C are provided with the escape parts. The fixed blade part 60C has an escape part 602C configured to escape the other wire W with respect to the moveable blade part 61C, for example.

The escape part 602C is provided by forming a concave part having a shape, into which the other wire W is to enter, at an end edge portion $601C_1$, to which the other wire W is to be pressed, of an opening end of the opening 601C to which the wire W is to be pressed during the movement of the moveable blade part 61C in the arrow C1 direction.

Also, an escape part 615C provided to the moveable blade part 61C is provided by recessing a part of the moveable blade 613C located at a position at which the other wire W is contacted, as compared to a part located at a position at which one wire W is contacted, with respect to the moving direction of the moveable blade part 61C shown with the arrow C1 and thereby forming a crank-shaped step at the moveable blade 613C. In the cutting unit 6C of FIG. 17, it is possible to delay the timing at which the cutting of the other wire W starts, as compared to the timing at which the cutting of one wire W starts. Meanwhile, in the embodiment of FIG. 17, the fixed blade part 60C and the moveable blade part 61C may be respectively provided with an escape part at a position at which one wire W is contacted, instead of the position at which the other wire W is contacted.

Figure 18:
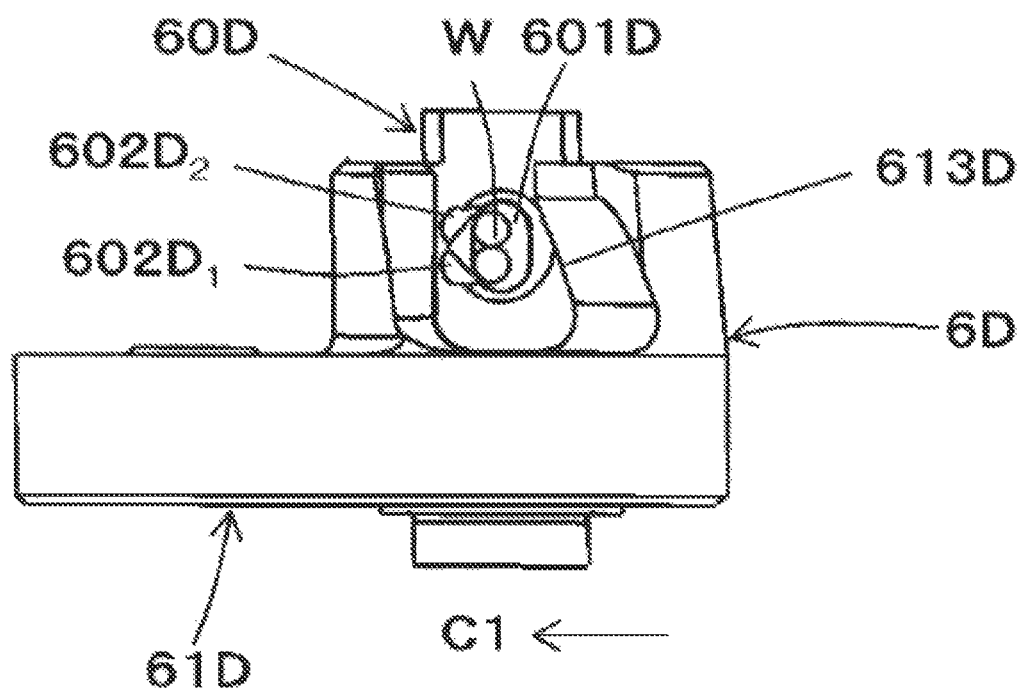
FIG. 18 is a top view depicting another example of the fixed blade part and the moveable blade part of the cutting unit of the embodiment.

A cutting unit 6D shown in FIG. 18 includes a fixed blade part 60D having an opening 601D through which the wire W is to pass, and a moveable blade part 61D mounted to be rotatable about the fixed blade part 60D, which is a shaft, and having a moveable blade 613D. A sectional shape of the opening 601D is a long hole shape through which the two wires W can pass with aligned in parallel, for example.

The moveable blade 613D of the moveable blade part 61D is obliquely provided with respect to the moving direction of the moveable blade part 61D denoted with the arrow C1. A side of the moveable blade 613D, to which one wire W is contacted thereto, is inclined in a retraction direction with respect to the moving direction of the moveable blade part 61D denoted with the arrow C1, and a position at which one wire W is contacted and a position at which the other wire W is contacted are provided on one line. The fixed blade part 60D has an escape part $602D_1$ configured to escape one wire W with respect to the moveable blade part 61D and an escape part $602D_2$ configured to escape the other wire W with respect to the moveable blade part 61D. In the cutting unit 6D of FIG. 18, it is possible to delay the timing at which the cutting of one wire W starts, as compared to the timing at which the cutting of the other W starts.

Figure 19:
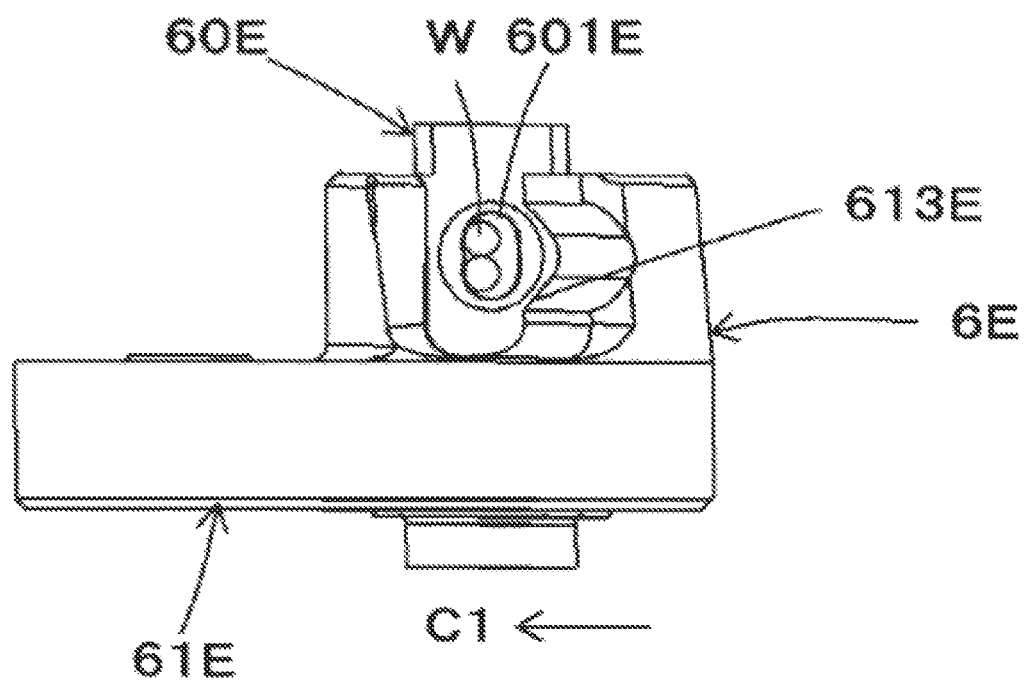
FIG. 19 is a top view depicting another example of the fixed blade part and the moveable blade part of the cutting unit of the embodiment.

A cutting unit 6E shown in FIG. 19 includes a fixed blade part 60E having an opening 601E through which the wire W is to pass, and a moveable blade part 61E mounted to be rotatable about the fixed blade part 60E, which is a shaft, and having a moveable blade 613E. A sectional shape of the opening 601D is a long hole shape through which the two wires W can pass with aligned in parallel, for example.

The moveable blade part 61E is provided with a semicircular concave portion at the moveable blade 613E with respect to the moving direction of the moveable blade part 61D denoted with the arrow C1. The moveable blade 613E is configured by a curved surface on which a position at which one wire W is contacted and a position at which the other wire W is contacted are inclined in opposite directions. A concave shape portion provided to one or both of the fixed blade part and the moveable blade part may be formed to have a rectangular shape, a curved shape or the like, in addition to the semicircular shape.

Figure 20:
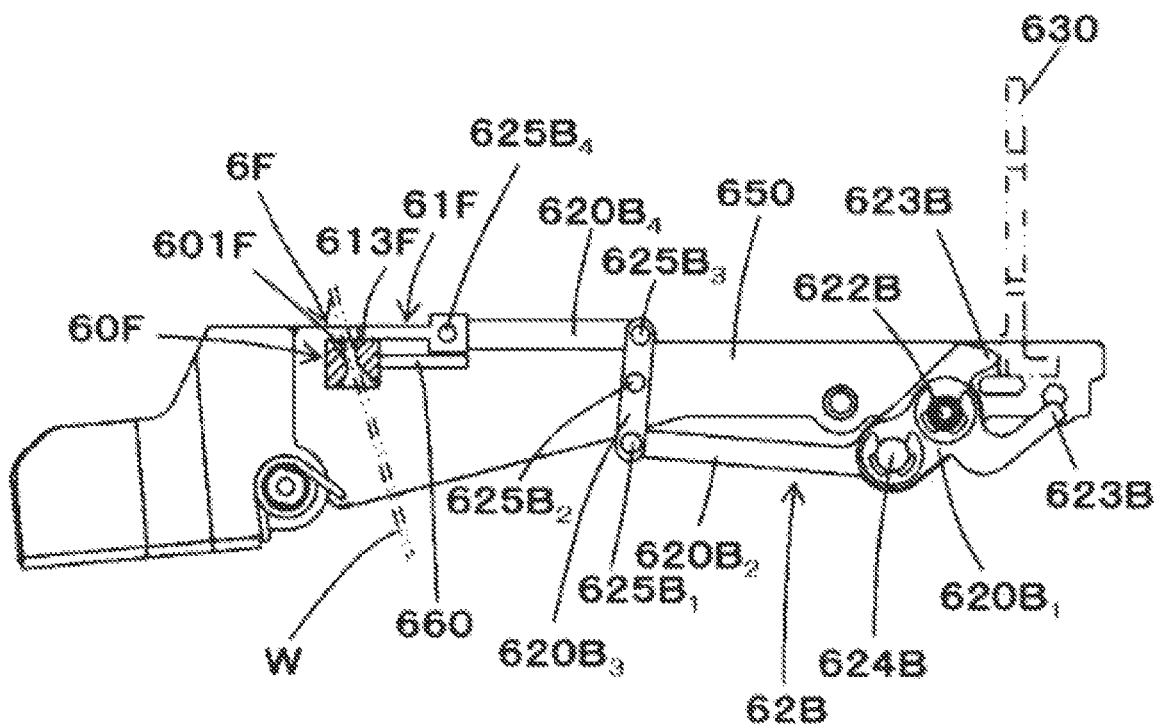
FIG. 20 is a side view depicting another example of the cutting unit of the embodiment.

FIG. 20 is a side view depicting another example of the cutting unit of the embodiment. In the below, another embodiment configured to operate a moveable blade part 61F is described. A cutting unit 6F includes a fixed blade part 60F having an opening 601F through which the wire W is to pass, and a moveable blade part 61F having a moveable blade 613F. One or both of the fixed blade part 60F and the moveable blade part 61F are provided with the escape part of the wire W. The moveable blade part 61F is configured to be displaced by sliding movement, instead of the rotating operation.

To this end, a slide guide 660 configured to guide the sliding movement of the moveable blade part 61F is provided. Also, the transmission mechanism 62B includes a first link 620B$_1$ to which the operation of the binding unit 7A is to be transmitted, and a second link 620B$_2$, a third link 620B$_3$ and a fourth link 620B$_4$ configured to transmit an operation of the first link 620B$_1$ to the moveable blade part 61F.

The first link 620B$_1$ is rotatably supported to a shaft 622B provided to the support member 650. The first link 620B$_1$ has a pressed part 623B, to which the operation of the binding unit 7A is to be transmitted, at one end portion with the shaft 622B being interposed therebetween. Also, the first link 620B$_1$ has a shaft 624B configured to rotatably support the second link 620B$_2$ at the other end portion with the shaft 622B being interposed therebetween.

The second link 620B$_2$ is coupled at one end portion to the first link 620B$_1$ to be rotatable about the shaft 624B, which is a support point. Also, the second link 620B$_2$ has a shaft 625B$_1$ configured to rotatably support the third link 620B$_3$ at the other end portion.

The third link 620B$_3$ is rotatably supported to a shaft 625B$_2$ provided to the support member 650. The third link 620B$_3$ is coupled at one end portion to the second link 620B$_2$ to be rotatable about the shaft 625B$_1$, which is a support point, with the shaft 625B$_2$ being interposed therebetween. Also, the third link 620B$_3$ has a shaft 625B$_3$ configured to rotatably support the fourth link 620B$_4$ at the other end portion.

The fourth link 620B$_4$ is coupled at one end portion to the third link 620B$_3$ to be rotatable about the shaft 625B$_3$, which is a support point. Also, the fourth link 620B$_4$ is coupled at the other end portion to the moveable blade part 61F to be rotatable about the shaft 625B$_3$ of the moveable blade part 61F, which is a support point.

The transmission mechanism 62B is configured so that the operation of the binding unit 7A is transmitted to the first link 620B$_1$ through the transmission member 630, the operation of the first link 620B$_1$ is transmitted to the moveable blade part 61F through the second link 620B$_2$, the third link 620B$_3$ and the fourth link 620B$_4$, and the moveable blade part 61F is thus slid with being guided by the slide guide 660. Thereby, the wire W having passed through the opening 601F of the fixed blade part 60F are cut by the moveable blade part 61F.

Figure 21A:
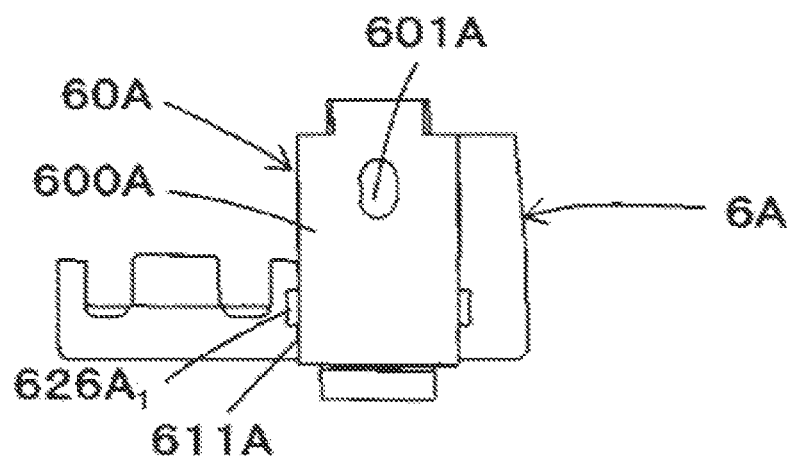
FIGS. 21A and 21B are sectional views depicting another modified embodiment of the cutting unit of the embodiment.
Figure 21B:
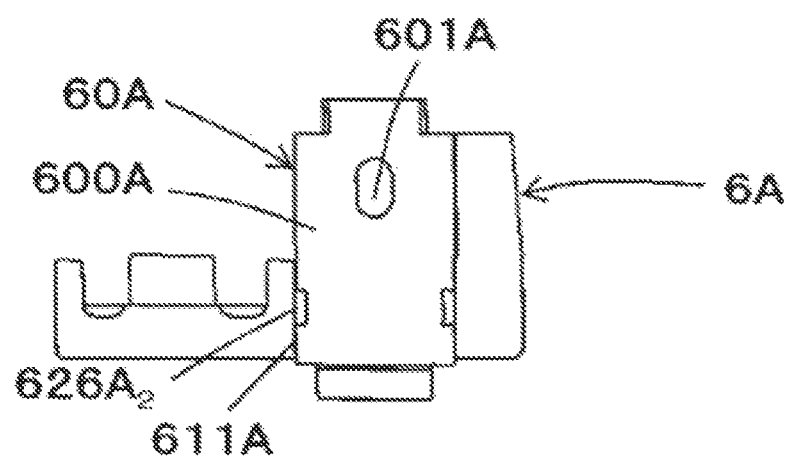

FIGS. 21A and 21B are a sectional view depicting another modified embodiment of the cutting unit of the embodiment. In the below, a configuration of suppressing variation in load is described. The cutting unit 6A includes the fixed blade part 60A having the opening 601A through which the wire W is to pass, and the moveable blade part 61A mounted to be rotatable about the shaft portion 600A of the fixed blade part 60A, which is a support point.

In FIG. 21A, an inner peripheral surface of the hole portion 611A of the moveable blade part 61A is formed with a groove portion 626A$_1$ in which grease is to be introduced. The groove portion 626A$_1$ is provided on an entire circumference of the hole portion 611A, is provided intermittently on the entire circumference or is provided at a part of the circumference.

In FIG. 21B, an outer peripheral surface of the shaft portion 600A of the fixed blade part 60A is formed with a groove portion 626A$_2$ in which grease is to be introduced. The groove portion 626A$_2$ is provided on an entire circumference of the shaft portion 600A, is provided intermittently on the entire circumference or is provided at a part of the circumference.

In the cutting unit 6A, the slide surface of the fixed blade part 60A and the moveable blade part 61A is formed with the groove portion in which grease is to be introduced, so that it is possible to enable the grease to remain for a long time. Thereby, it is possible to suppress an increase in load and an operation defect, which may be caused as the grease is consumed.

In the respective embodiments, the cutting unit is configured by combining the fixed blade part and the moveable blade part. However, both may be configured as the moveable blade parts. Also, the configuration of cutting the two wires has been exemplified. However, it is possible to accomplish the similar effects even with a configuration of cutting three or more wire W. Also in a configuration of cutting one wire W, the similar effects are accomplished. Also in a configuration of cutting the wire W having a sectional shape different from the circular shape, such as an elliptical shape and a shape having a plurality of continuing circular shapes, the similar effects are accomplished.

1A . . . reinforcing bar binding machine, 2A . . . magazine, 20 . . . reel, 3A, 3B, 3C . . . wire feeding unit, 30L . . . first feeding gear (feeding member), 31L . . . tooth part, 32L . . . groove portion, 30R . . . second feeding gear (feeding member), 31R . . . tooth part, 32R . . . groove portion, 33 . . . feeding motor (motor), 33a . . . small gear, 33b . . . large gear, 34 . . . drive force transmission mechanism, 34a . . . feeding small gear, 36 . . . displacement member, 4A$_1$ . . . first wire guide, 4A$_2$ . . . second wire guide, 5A . . . curl guide unit, 50 . . . curl guide (first guide), 51 . . . inductive guide (second guide), 53 . . . retraction mechanism, 53a . . . first guide pin, 53b . . . second guide pin, 6A . . . cutting unit, 60A . . . fixed blade part (blade part), 600A . . . shaft portion, 601A . . . opening, 601A$_1$ . . . end edge portion, 602A$_1$ . . . escape part, 61A . . . moveable blade part (blade part), 610A . . . moveable part main body, 611A . . . hole portion, 612A . . . shaft support portion, 613A . . . moveable blade, 614A . . . shaft, 62A . . . transmission mechanism, 620A . . . first link, 621A . . . second link, 622A . . . shaft, 623A . . . pressed part, 624A . . . shaft, 630 . . . transmission member, 7A . . . binding unit, 70 . . . gripping part, 70C . . . fixed gripping member, 70L . . . first moveable gripping member, 70R . . . second moveable gripping member, 71 . . . bending part, 71a . . . opening and closing pin, 76 . . . shaft, 8A . . . drive unit, 80 . . . motor, 81 . . . decelerator, 82 . . . rotary shaft, 83 . . . moveable member, W . . . wire

The invention claimed is:

1. A binding machine comprising:
a wire feeding unit configured to feed a plurality of wires to be wound on an object to be bound;
a cutting unit configured to cut the plurality of wires wound on the object to be bound; and
a binding unit configured to twist the plurality of wires wound on the object to be bound,
wherein the cutting unit comprises a pair of blade parts configured to interpose the plurality of wires therebetween and cut the plurality of wires,
the pair of blade parts include an opening through which the plurality of wires can pass while being aligned in parallel, the plurality of wires are cut by relative movement of end edge parts of the pair of blade parts in sliding contact with each other, and a cutting direction which is a direction of the relative movement is orthogonal to a direction in which the plurality of wires are aligned in parallel, one or both of the pair of blade parts comprise a delay part which is configured to delay cutting a part of the plurality of wires as compared to a remaining part of the plurality of wires, and the delay part is a concave part which is provided to the end edge part of one or both of the pair of blade parts and which is recessed in the cutting direction to delay cutting the part of the plurality of wires.

2. The binding machine according to claim 1, wherein the delay part is configured to delay cutting at least one wire of the plurality of wires as compared to the other wires of the plurality.

3. The binding machine according to claim 1, wherein the concave part has a curved shape.

4. The binding machine according to claim 1, wherein the concave part has a semicircular shape.

5. A binding machine comprising:
a wire feeding unit configured to feed a plurality of wires to be wound on an object to be bound;
a cutting unit configured to cut the plurality of wires wound on the object to be bound; and
a binding unit configured to twist the plurality of wires wound on the object to be bound,
wherein the cutting unit comprises a pair of blade parts configured to interpose the plurality of wires therebetween and cut the plurality of wires,
the pair of blade parts include an opening through which the plurality of wires can pass while being aligned in parallel, the plurality of wires are cut by relative movement of end edge parts of the pair of blade parts in sliding contact with each other, and a cutting direction which is a direction of the relative movement is orthogonal to a direction in which the plurality of wires are aligned in parallel, and the end edge parts of one or both of the pair of blade parts are formed to have a crank shape in a cutting direction to delay cutting a part of the plurality of wires as compared to a remaining part of the plurality of wires.

6. A binding machine comprising:
a wire feeding unit configured to feed a plurality of wires to be wound on an object to be bound;
a cutting unit configured to cut the plurality of wires wound on the object to be bound; and
a binding unit configured to twist the plurality of wires wound on the object to be bound,
wherein the cutting unit comprises a pair of blade parts configured to interpose the plurality of wires therebetween and cut the plurality of wires,
the pair of blade parts include an opening through which the plurality of wires can pass while being aligned in parallel, the plurality of wires are cut by relative movement of end edge parts of the pair of blade parts in sliding contact with each other, and a cutting direction which is a direction of the relative movement is orthogonal to a direction in which the plurality of wires are aligned in parallel, and one or both of the pair of blade parts is inclined in a cutting direction of the blade parts to delay cutting a part of the plurality of wires as compared to a remaining part of the plurality of wires.

7. The binding machine according to claim 1, wherein the concave part is arranged so that after cutting of at least one of the plurality of wires starts, when the one wire is cut by a radial half or larger, cutting of the another wire of plurality of other wires starts.

8. The binding machine according to claim 1, wherein
a dimension of the concave part in the cutting direction of the blade part is set to a substantial half of the diameter of one wire of the plurality of wires.

* * * * *